(12) United States Patent  
Dolce

(10) Patent No.: US 8,481,943 B2  
(45) Date of Patent: Jul. 9, 2013

(54) NET SOLAR RADIOMETER

(75) Inventor: Robert Dolce, Manorville, NY (US)

(73) Assignee: AccuFlux Inc., Bohemia, NY (US)

( * ) Notice: Subject to any disclaimer, the term of this patent is extended or adjusted under 35 U.S.C. 154(b) by 305 days.

(21) Appl. No.: 12/942,885

(22) Filed: Nov. 9, 2010

(65) Prior Publication Data

US 2012/0055244 A1    Mar. 8, 2012

Related U.S. Application Data

(63) Continuation-in-part of application No. 12/876,117, filed on Sep. 4, 2010, now Pat. No. 8,294,101.

(51) Int. Cl.  
*G01J 5/02* (2006.01)

(52) U.S. Cl.  
USPC .................................. 250/339.04; 250/339.01

(58) Field of Classification Search  
USPC ........................................ 250/339.01, 339.04  
See application file for complete search history.

(56) References Cited

U.S. PATENT DOCUMENTS

| | | | | |
|---|---|---|---|---|
| 3,054,841 | A | * | 9/1962 | Fritschen ........................ 136/213 |
| 3,819,419 | A | | 6/1974 | Loose |
| 2004/0136434 | A1 | * | 7/2004 | Langley ............................ 374/29 |
| 2011/0030728 | A1 | * | 2/2011 | Semmer et al. .................. 134/18 |

FOREIGN PATENT DOCUMENTS

| NL | 2005813 A | 3/2012 |
|---|---|---|
| NL | 2005814 A | 3/2012 |

OTHER PUBLICATIONS

"NR01", HuksefluxUSA. Accessed from <http://www.huksefluxusa.com/pdfs/NR01.pdf> on Nov. 27, 2012.*  
Kipp and Zonen Net Radiometers for Measurement of Energy Balance, Publication Date Unknown, The Netherlands. pp. 2, 4.  
Eplab Black and White Pyranometer Model 8-48 Datasheet, Publication Date: at least as early as Mar. 2004.  
Fischer Product Datasheet No. 461105 Starpyranometer Edition: 1, Apr. 2005, pp. 1-3, Germany.  
Douglas R. Cobos, John M. Baker, Evaluation and Modification of a Domeless Net Radiometer, Agronomy Journal, pp. 181-183, vol. 95, Jan.-Feb. 2003.  
Hardy B. Granberg, Adrew Nadeau, An Inexpensive Net Radiometer for Multipoint Spatial Surveys, Review Scientific Instruments 60, 3796 (1989) (Abstract).  
J.A. Brotzge, C.E. Duchon, A Field Comparison among a Domeless Net Radiometer, Two Four-Component Net Radiometers, and a Domed Net Radiometer, Journal of Atmospheric and Oceanic Technology vol. 17, Dec. 2000, pp. 1569, 1577-1582.

(Continued)

*Primary Examiner* — Casey Bryant  
(74) *Attorney, Agent, or Firm* — Alan M. Flum; Stone Creek Services LLC

(57) ABSTRACT

An improved net radiometer that measures the total net difference between incoming solar and surface reflected radiant short-wave solar energy flux, and inclusive of the down and upwelling long-wave infrared terrestrial radiant energy flux, within the combined short-wave and long-wave far infrared spectral range is disclosed. Disclosed are net radiometers with thermal absorbers structured to reduce wind sensitivity while maintaining or improving response time. Also disclosed are net radiometers that are configured in a novel way to reduce moisture and water accumulation on the thermal absorber surfaces. In addition, net radiometers are disclosed where the components are configured and thermal absorber structured to reduce unit-to-unit inconsistencies and minimize absorber sensitivity asymmetry effect between the upper and lower instrument absorbers.

12 Claims, 16 Drawing Sheets

OTHER PUBLICATIONS

Bernardo A. Carnicero Domiguez, Characterization of Pyranometer Thermal Offset and Correction of Historical Data, Master's Thesis, Virginia Polytechnic Institute, Jun. 15, 2001. (Abstract).

Delta Ohm Product Catalog, LP NET 07 on p. 17, Publication Date Unknown.

Mark Blonquist, Bert Tanner, Bruce Bugbee, Comparison of Two New Net Radiometers, Presentation, Publication Date Unknown. pp. 1, 3, 7-8, 12, 21-23.

Search Report and Written Opinion, Dutch Patent Application No. NL2005813, Netherlands Ministry of Economic Affairs, Agriculture and Innovation, Jul. 6, 2012.

Search Report and Written Opinion, Dutch Patent Application No. NL2005814, Netherlands Ministry of Economic Affairs, Agriculture and Innovation, Jul. 9, 2012.

Pedro Gavilan, Joaquin Berengena, Richard G. Allen, "Measuring versus estimating net radiation and soil heat flux: Impact on Penman—Monteith reference ET estimates in semiarid regions", Agricultural Water Management, May 10, 2007, pp. 275-286, vol. 89, Issue 3, Elsevier.

Granberg, Hardy B., "An Inexpensive Net Radiometer for Multipoint Spatial Surveys", Review of Science Instruments, Dec. 1989, pp. 3796-3801, vol. 60, No. 12, American Institute of Physics, New York, US.

"NR LITE Net Radiometer", Jan. 1, 2009, Kipp and Zonen B.V., Netherlands.

"CNR 4 Net Radiometer Instruction Manual", Jan. 1, 2009, Kipp and Zonen B.V., Netherlands.

Robert Dolce, "Net Radiometer", Wikipedia, Jun. 8, 2010, accessed on the Internet: http://en.wikipedia.org/wiki/Net_radiometer, photograph in lower right hand corner of p. 2, non-working mock-up of the inventor's own work, provide here for reference.

\* cited by examiner

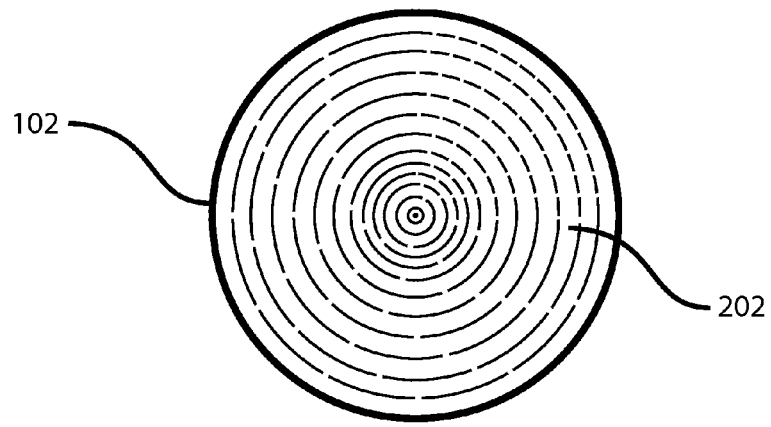
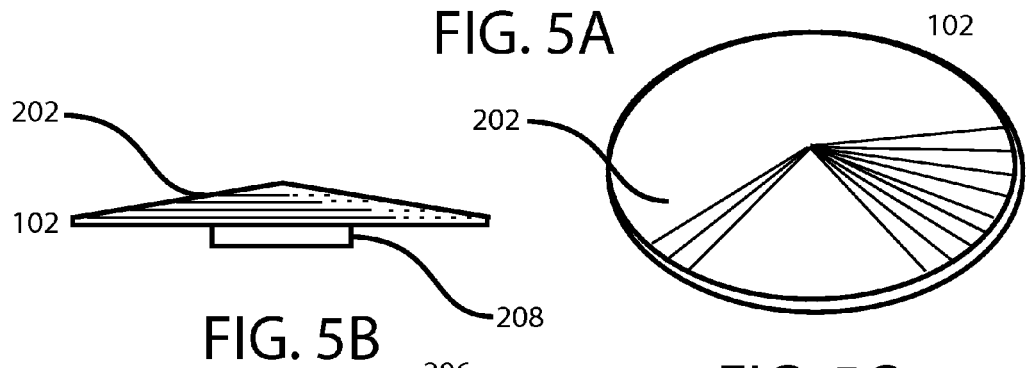
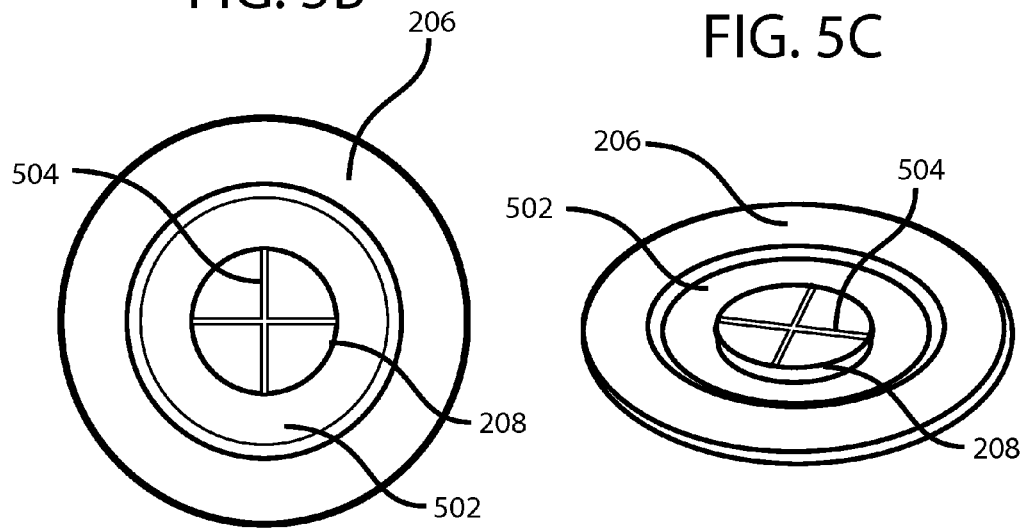
FIG. 5A
FIG. 5B
FIG. 5C
FIG. 5D
FIG. 5E

NET SOLAR RADIOMETER

This application is a continuation in part of U.S. patent application Ser. No. 12/876,117 filed on Sep. 4, 2010. The entire contents of U.S. patent application Ser. No. 12/876,117 are hereby incorporated by reference.

BACKGROUND

The present invention relates to a class of meteorological test and measurement instruments, or apparatus, for measuring the total net energy flux difference between naturally occurring incoming solar radiant energy flux and surface reflected short-wave energy flux, and/or emitted radiant terrestrial infrared energy flux. Specifically, the field of invention is a class of instruments known as net radiometers. Net radiometers are typically used to assess the total net energy balance between the incoming solar and down-welling terrestrial infrared energy flux, and the surface reflected solar and ground emitted infrared energy flux.

Net radiometers are an important instrument for global climate change research and agro-meteorology. For global climate change research, net radiometers are often deployed in glacial studies, where they are used to monitor the total net energy exchange over the ice sheet. Net radiometers are also commonly deployed on forest floors, within canopies, and above forest canopies, in combination, to study correlations between biological activity and net energy flux. For agro-meteorology, net radiometers are typically used in combination with other metrological instruments to measure loss of water in wetlands such as the Everglades, or to control irrigation on large farms.

Net radiometers measure the difference between total incoming radiant solar and down-welling terrestrial infrared energy flux, and the surface reflected solar and emitted terrestrial infrared energy flux. Net solar radiation is the difference between the incoming radiant solar energy flux and the surface reflected solar energy flux, extending from 2000-4000 nm in wavelength. Net infrared radiation is the difference between the down welling and surface emitted upwelling terrestrial infrared energy flux, extending from 4000-50,000 nm in wavelength. Total net radiation is the total net difference between to incoming solar and down-welling terrestrial infrared energy flux, and the surface reflected solar and emitted upwelling terrestrial infrared energy flux.

Typically in the daytime, the majority of net radiant energy contribution comes from incoming short-wave radiant energy from the sun. At night the majority of net radiant energy contribution typically comes from up-welling long-wave far infrared radiant energy from the ground. Short-wave radiant energy is generally defined as radiant energy in the ultraviolet, visible, and near-infrared wavelengths. The spectral range is approximately 200 to 4000 nm. Any radiant up-welling or down-welling energy with a spectral range of approximately 4000 nm to 50,000 nm is referred to as long-wave far infrared radiant energy.

Two examples of net radiometer types are four-absorber and two-absorber net radiometers. A two-absorber net radiometer includes a single pair of virtually identical thermal absorbers, one upward facing and the other downward facing. Each thermal absorber is thermally responsive across the short-wave radiant energy and long-wave far infrared radiant energy spectra. The upward facing thermal absorber absorbs incoming radiant solar and down-welling terrestrial infrared energy from the sky above, while the downward facing thermal absorber absorbs radiant solar and infrared energy either reflected or emitted from the ground.

A four-absorber net radiometer includes two pairs of absorbers. One pair is configured to respond exclusively to short-wave radiant solar energy flux, while the other pair is configured to respond exclusively to long-wave far infrared radiant energy flux. Typically, each absorber is configured to respond exclusively to the radiant solar energy flux signal is covered by a dome that filters out any long-wave far infrared energy flux, permitting only the radiant solar energy flux signal to reach the absorber surface. The domes are typically made of glass or other material opaque to long-wave far infrared radiant energy flux. Typically, each absorber configured to respond exclusively to long-wave far infrared radiant energy flux is covered with a solar blind filter which blocks the transmission of any radiant solar energy flux, permitting only the far infrared signal to reach the absorber surface. Optical lenses and domes also have an added benefit of shielding the thermal absorber surfaces from the elements. Each pair of absorbers has an upward facing and downward facing thermal absorber. While each pairs of absorbers are configured differently from each other, each absorber within a pair is configured virtually identical to the other absorber within the pair.

Unlike their four-absorber counterparts, many two-absorber net radiometers have absorbers that are typically uncovered and exposed to the elements. This creates a number of problems and creates potential for measurement error. One form of measurement error results from moisture deposition and retention on the absorber surfaces. Moisture retained on the absorber surface typically come in the form of rain, snow, or dew and frost. Water blocks the transmission of long-wave far infrared radiant energy flux from being transmitted to and from the absorber surface. The black surface of the thermal absorber is especially prone to the formation of dew. Some domeless two absorber net radiometers, such as the Kipp and Zonen NR Lite2 and Delta Ohm LP Net 07 models, attempt to solve this problem by coating the thermal absorber surfaces with a water repellent or hydrophobic coating such as Polytetrafluoroethylene (PTFE), which is often sold under the brand name Teflon. They also conically pitch the outward facing absorber surface in order to encourage water to roll off the surface. While these measures help reduce moisture retention, they often do not adequately remove moisture from the thermal absorber surface.

Another form of measurement error is caused by convective signal interference from wind blowing across the absorber surface, commonly referred to as wind sensitivity effect. Wind induced sensitivity error can manifest as either as positive or negative signal offset bias on the net radiometer output signal and resulting net energy measurement calculation. Increasing the mass of the absorber so that heat is more difficult to dissipate slows down the response time of the instrument and makes the instrument less sensitive to the effects of wind. Reduced instrument response time however has the unwanted effect of making the instrument less responsive, or non responsive, to any sudden change in signal, particularly for any rapidly occurring low level solar or infrared flux signal changes. A third form of measurement error, which is difficult to quantify, are inconsistencies in performance characteristics that vary from unit to unit. These are considered in the art as an inherent limitation in two-way net radiometer design, otherwise known as sensitivity asymmetry effect.

Improvements in the art are always desirable therefore there is a need for a two-absorber net radiometer were measurement errors caused by moisture retention on the instrument active absorber surfaces, wind sensitivity effect, and inconsistencies in performance characteristics due to absorber sensitivity asymmetry effect, are minimized.

SUMMARY

The inventor has observed on other commercially available domeless two absorber net radiometers known in the art, moisture often becomes trapped in the junction where the net radiometer body and the thermal absorber outer circumference edge meet, resulting in significant signal degradation and measurement error. The inventor recognized the presence of the trapped moisture, or water droplets, in or on the aforementioned junction area is due to inadequate instrument drainage design, which is otherwise achieved by breaking the surface tension of unwanted moisture droplets once formed, and channeling them away from the sensitive absorber junction area. The surface tension acts an impediment to efficient moisture removal from the thermal absorber surface. Net radiometers in accordance with principles of the invention may include thermal absorbers mounted so that their circumferential edges form an outward ridge with respect to the plane of the net radiometer body so as to break the surface tension that may potentially form at the junction.

In a further embodiment, the net radiometer has drain holes positioned so that they overlap the outer circumference of the upward facing thermal absorber. The drain holes are shaped so that they do not overlap the outer circumference of the downward facing thermal absorbers. To further enhance removal of moisture, a grove concentric to the thermal absorber can be either cast or machined into the net radiometer body bottom surface. The concentric groove is positioned to either intersects the drain holes or positioned between the drain holes and the downward facing thermal absorber. This groove enhances drainage by acting as a drip edge and preventing moisture from accumulating on the downward facing thermal absorber.

In addition, the inventor discovered that some of the trade-off between wind sensitivity and response time could be overcome by creating a thermal absorber with a novel shape. Instead of having a flat planar bottom with an approximately centric stem as with current state of the art in net radiometer thermal absorber design, an example of a thermal absorbers embodying principles of the invention has a groove or portion of material removed from the bottom of the thermal absorber near the centric stem. This in effect allows for a larger absorber top surface without increasing the absorber thermal mass.

In addition, the inventor discovered, through a series of experiments, that the stem size could be increased in proportion to the amount of material, by weight, removed from the bottom of the thermal absorber and still allow for an increase in diameter of the top thermal absorber surface. An absorber so constructed, yields the unexpected result, of allowing for an absorber with significantly less wind sensitivity but with up to 50% better response time than a conventionally constructed net radiometer thermal absorber.

The inventor also identified part of the source of the problem measurement inconsistencies from unit to unit. The net radiometer includes a metal disc that thermally couples heat from the thermal absorber to a thermopile. The efficiency of coupling of the thermal absorber to the metal disc turns out to be a significant source of error that varies from unit to unit. The inventor discovered that radial grooves or channels in the thermal absorber stem bottom for channeling the thermally conductive glue offer a very consistent and efficient thermal junction.

In addition, a thermally insulative spacer or disc can be used to consistently align the stem and further reduce error from unit to unit. The stem has additional benefits. The insulative spacer can be sized and proportioned so that the thermal absorber form a consistent circumferential edges form an outward ridge with respect to the plane of the net radiometer body so as to break the surface tension of moisture that may potentially form at the junction.

DRAWINGS

These and other features, aspects, and advantages of the present invention will become better understood with regard to the following description, appended claims, and accompanying drawings where:

FIG. 5A shows a top view of a thermal absorber of FIG. 2;

FIG. 5B shows a side view of a thermal absorber of FIG. 2;

FIG. 5C shows a top perspective view of a thermal absorber of FIG. 2;

FIG. 5D shows a bottom view of a thermal absorber of FIG. 2;

FIG. 5E shows a bottom perspective view of a thermal absorber of FIG. 2;

DESCRIPTION

Figure 1:
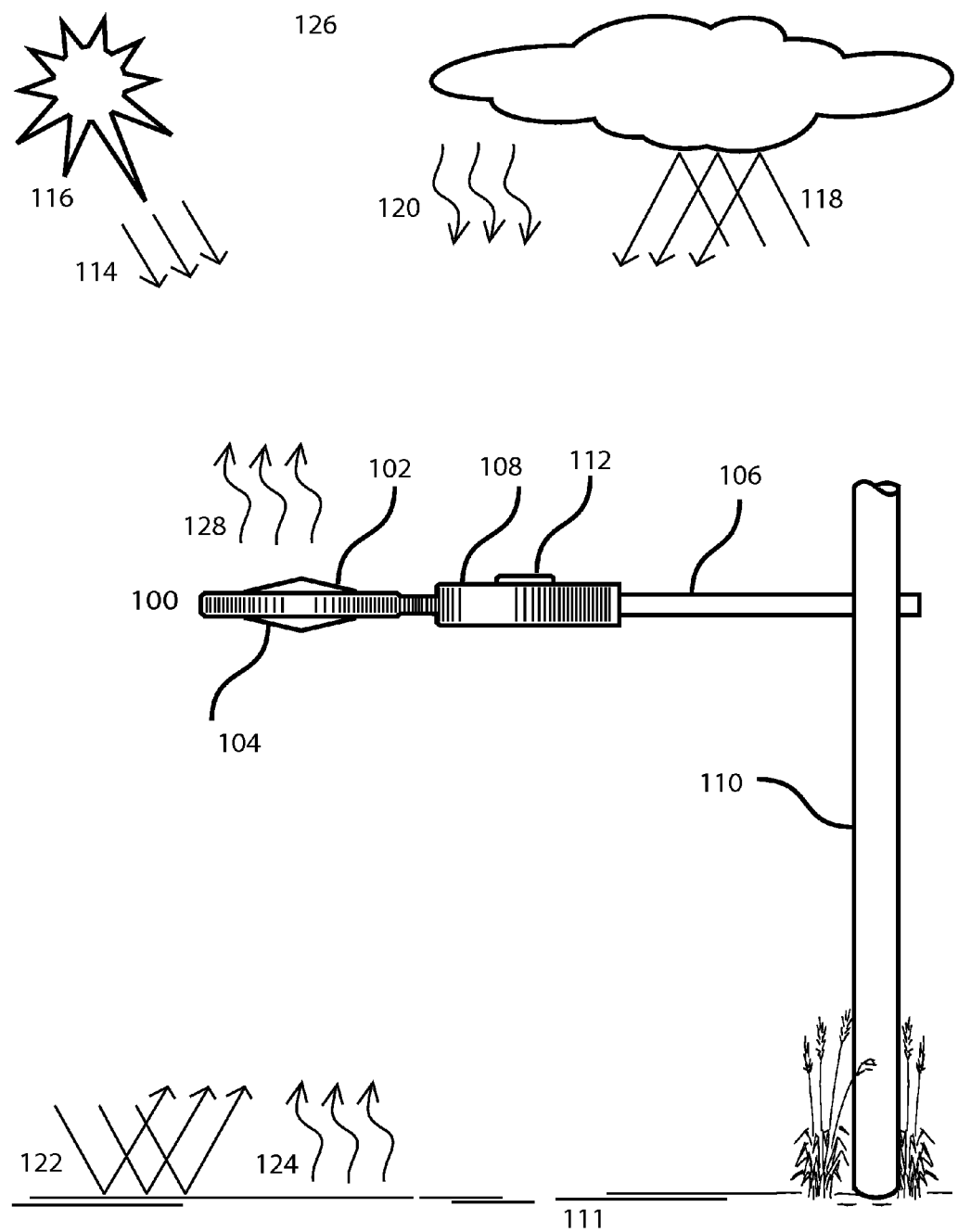
FIG. 1 shows a net radiometer embodying features of the invention in a typical operating environment.

Referring now to the drawings in detail wherein like numerals indicate like elements throughout the several views, FIG. 1 shows a net radiometer 100 embodying principles of the invention and operating in a typical outdoor environment. Net radiometer 100 includes two thermal absorbers; an upper thermal absorber 102 and lower thermal absorber 104 that are mounted 180 degrees in opposition. This allows for the upper thermal absorber 102 to face horizontally upward while the lower thermal absorber 104 faces horizontally downward. In the illustrated embodiment, a mounting rod 106 is screwed into the net radiometer body 108. The mounting rod 106 is in turn connected to a mounting pole 110 that is secured into the surface of the ground 111. A bubble level 112 is used to assure that the net radiometer 100 is horizontally level.

During the day, most of the energy received by the net radiometer 100 comes from sun generated short-wave radiant energy 114 from the sun 116 falling on the upper thermal absorber 102. In addition, the upper thermal absorber 102 receives scattered diffuse sky field short-wave radiant energy 118 and down-welling long-wave infrared radiant energy 120. The lower thermal absorber 104 receives daytime thermal radiant energy from a combination of ground reflected short-wave radiant energy 122 and up-welling far infrared radiant energy 124 from the ground 111.

At night, typically the largest contribution of radiant energy received by the net radiometer 100 is from up-welling far infrared radiant energy 124 from the ground 111 radiated to the cold sky 126 above, as received by the lower thermal absorber 104, as well as infrared radiative emission 128 of the upper thermal absorber 102 to the same cold sky 126 above.

Referring to FIG. 1, FIG. 2, FIG. 2A and FIG. 3, the upper thermal absorber 102 is coated with a material that enables it to be capable of absorbing and converting to heat, sun generated short-wave radiant energy 114, scattered diffuse sky field short-wave radiant energy 118, and down-welling long-wave infrared radiant energy 120. In addition, the surface must be able to resist the elements and repel moisture. PTFE (Polytetrafluoroethylene), often sold under the brand name Teflon, has excellent water repellent or hydrophobic properties making it a desirable surface coating. Black PTFE absorbs both long-wave far infrared and short-wave radiant energy. The upper thermal absorber 102 is made of a heat conductive material such as aluminum.

Figure 2:
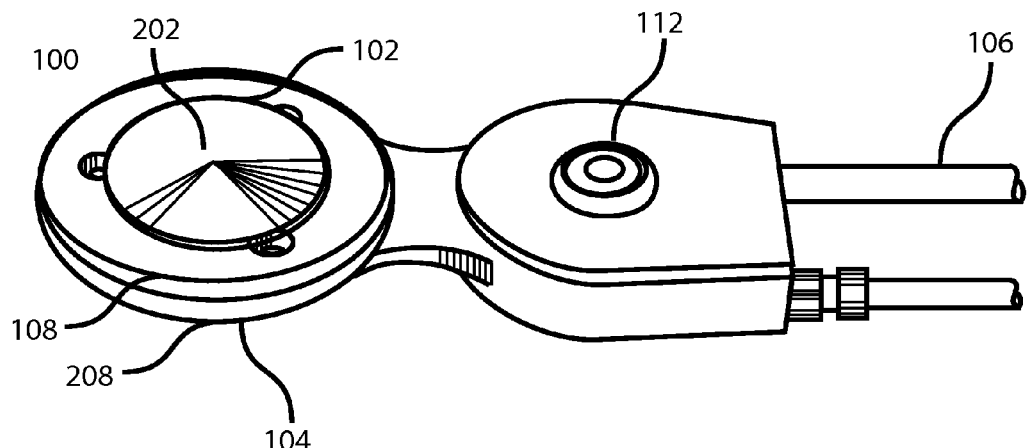
FIG. 2 shows a perspective view of a two-absorber net radiometer embodying principles of the invention.
Figure 2A:
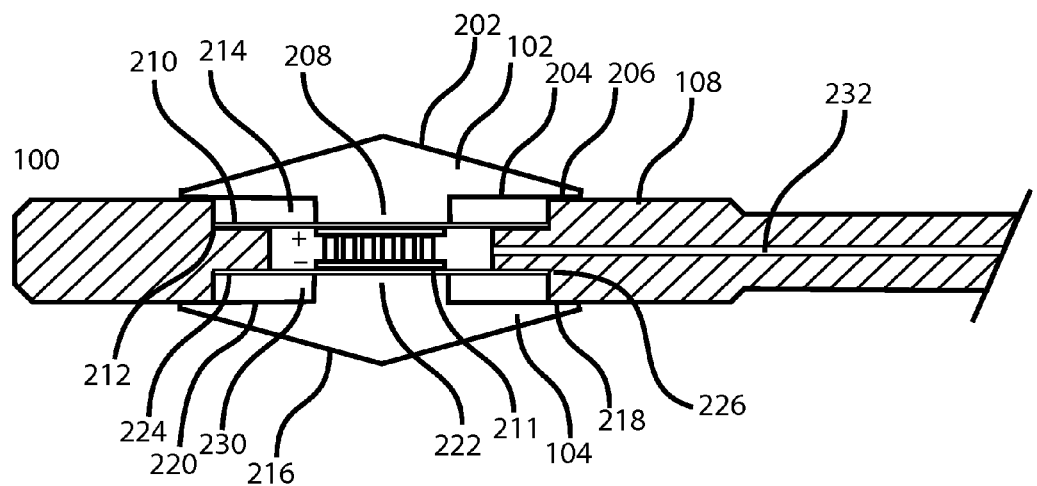
FIG. 2A shows a partial cross sectional view of the net radiometer shown in FIG. 2.
Figure 3:
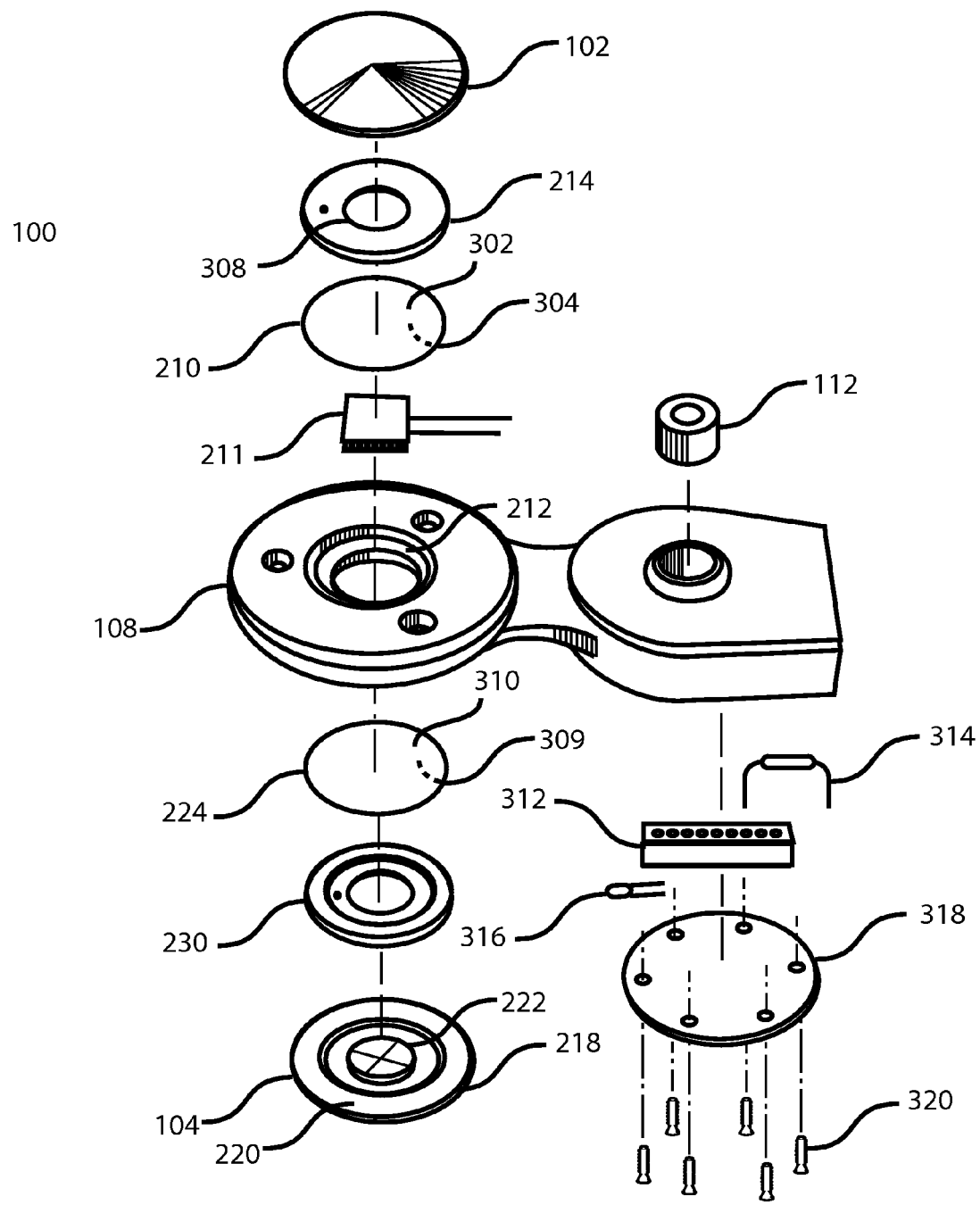
FIG. 3 shows an exploded perspective view of an embodiment of the net radiometer shown in FIG. 2.

The upper thermal absorber 102 has an outward facing surface 202 with respect to the net radiometer body 108 and a bottom or inward facing surface 204 with respect to the net radiometer body 108. The inward facing absorber surface includes two portions: an outer planar region 206 that is essentially flat and a stem 208. The stem is approximately centric to the upper thermal absorber 102 bottom surface. In FIG. 2A and FIG. 3, the stem 208 is cylindrical in shape and extends into the net radiometer body 108 farther than the outer planar region 206.

A portion of the heat flows through the stem 208 to a first thermally conductive metal disc 210. Another portion of the heat load signal is dissipated through the net radiometer body 108. The net radiometer body 108 is made of a thermally conductive material, such as aluminum, and acts as a heat sink, conducting away heat from the absorber and dissipating the heat to the surrounding ambient environment. Referring to FIG. 3, the first thermally conductive metal disc 210 has an outward facing surface 302 and an inward facing surface 304 with respect to the net radiometer body 108. Referring to FIG. 2A, the centric portion of the first thermally conductive metal disc 210 outward facing surface 302 is in thermally conductive contact with the stem 208. Referring to both FIG. 2A and FIG. 3, the centric portion of the inward facing surface 304 of the first thermally conductive metal disc 210 is in thermal conductive contact with the upper surface of a thermopile 211. The outer edge of first thermally conductive metal disc 210 is in thermal contact with the net radiometer body 108. In FIG. 2A and FIG. 3, the first thermally conductive metal disc rests on a first ledge 212 machined or cast with the net radiometer body 108.

Referring to FIG. 2A and FIG. 3, a first thermally insulative disc 214 aligns the stem 208 of the upper thermal absorber 102 approximately with the center of the first thermally conductive metal disc 210. The first thermally insulative disc 214 is made of a material which impedes thermal conductivity and radiative infrared transmission, and is not damaged by heat under naturally occurring environmental conditions, such as nylon, polyoxymethylene (often sold under the brand name Delrin), or other thermal plastic materials. The top or outward facing surface of the first thermally insulative disc 214 impinges against the outer planar region 206 surface. The inward facing surface of the first thermally insulative spacer impinges against an outer portion of first thermally conductive metal disc 210 outward facing surface. Referring to FIG. 2A and FIG. 3, the first thermally insulative disc 214 includes a hole 308 located in the center of the disc and disposed to receive the stem 208. The first thermally insulative disc 214 thickness is proportioned so that the outer edge of the upper thermal absorber 102 is properly seated against the upper surface of the net radiometer body 108 while at the same time the stem 208 of the upper thermal absorber 102 impinges against the centric portion of the first thermally conductive metal disc 210.

Figures 4A, 4C:
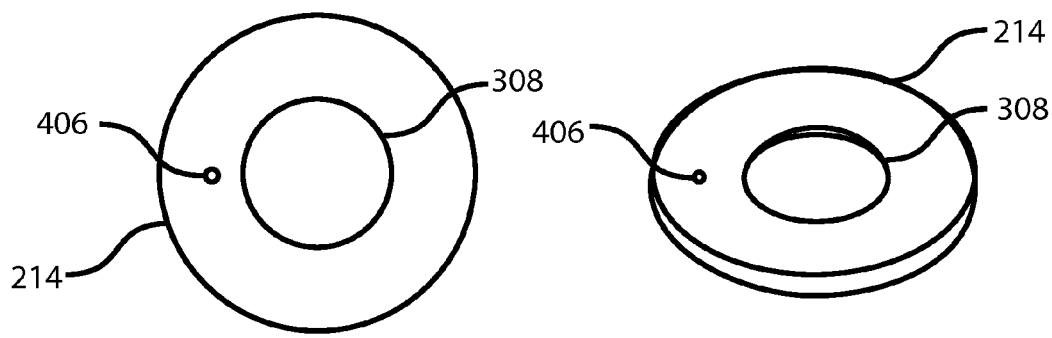
FIG. 4A shows a top or outward facing surface of an embodiment of thermally insulative disc of FIG. 2.
FIG. 4C shows a top perspective view of an embodiment of thermally insulative disc of FIG. 2.
Figures 4B, 4D:
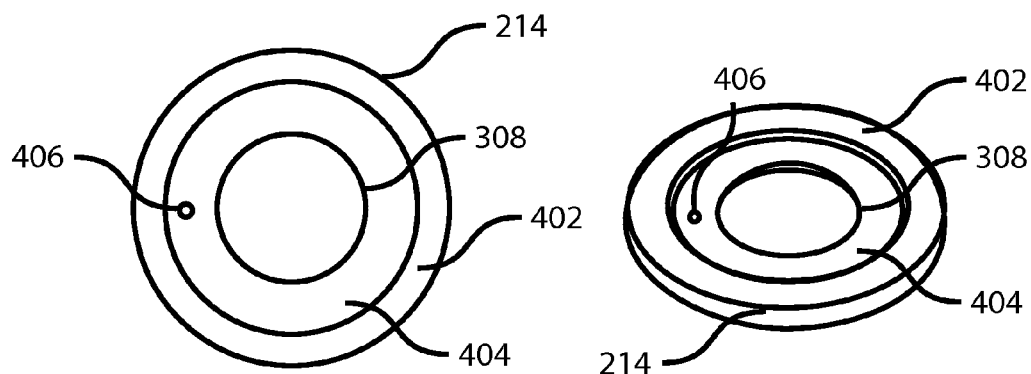
FIG. 4B shows a bottom or inward facing surface of an embodiment of thermally insulative disc of FIG. 2.
FIG. 4D shows a bottom perspective view of an embodiment of thermally insulative disc of FIG. 2.

FIG. 4A shows a top or outward facing surface of an embodiment of the first thermally insulative disc 214. FIG. 4B shows a bottom or inward facing surface, FIG. 4C is a top surface perspective view, and FIG. 4D, a bottom surface perspective view. Referring to FIG. 4B and FIG. 4C, the first thermally insulative disc 214 has an outer portion 402 and an inner portion 404. Referring to FIG. 2A, and FIG. 4D, the outer portion 402 impinges against the first thermally conductive metal disc 210 while the inner portion does not impinge against the first thermally conductive metal disc 210. A portion of material between the hole 308 and the outer portion may be machined away to form the recessed inner seat portion 404. Alternatively the shape embodied in FIG. 4A, FIG. 4B, FIG. 4C, and FIG. 4D, may be formed by injection molding process.

FIG. 4A, FIG. 4B, FIG. 4C, and FIG. 4D, show an air pressure relief hole 406 formed as a small non-centric hole in the outer portion of the first thermally insulative disc 214. This pressure relief hole 406 helps to reduce excess air pressure that can build up when mounting and seating the upper thermal absorber 102 to the first thermally conductive metal disc 210 during instrument assembly.

The arrangement of the upper thermal absorber 102, first thermally conductive metal disc 210, first thermally insulative disc 214, net radiometer body 108, and upper surface the thermopile 211 described above has the following affect. Radiative energy falling on the upper thermal absorber 102 is both absorbed and converted to heat. A portion of the thermal load radiates through the stem 208 of the upper thermal absorber 102 and by thermal conduction through the central portion of the first thermally conductive metal disc 210 to the upper surface of the thermopile 211. The remainder of the thermal signal load in the absorber is partially conducted away through the net radiometer body 108 and partially radiated away as long-wave far infrared radiant energy. Any excess in thermal signal load accumulating in either the first thermally conductive metal disc 210 or the thermopile 211 upper surface is conducted away through the net radiometer body 108 through the outer edge of the first thermally conductive metal disc 210.

Similarly, the lower thermal absorber 104 is constructed in such a way as to create nearly an identical thermal profile as upper thermal absorber 102 with equivalent spectral sensitivity. In the illustrated embodiment of FIG. 2A and FIG. 3, this is accomplished by using nearly identically constructed absorbers. The lower thermal absorber 104 is coated with a material that enables it to absorb and converting to heat, ground reflected short-wave radiant energy 122 and up-welling far infrared radiant energy 124 from the ground 111. In addition, the surface must be able to resist the elements and repel moisture. PTFE (Polytetrafluoroethylene), often sold under the brand name Teflon, has excellent water repellent or hydrophobic properties making it a desirable surface coating. Black PTFE absorbs both long-wave far infrared and short-wave radiant energy. The lower thermal absorber 104 is made of a heat conductive material such as aluminum.

The lower thermal absorber has an outward facing surface 216 with respect to the net radiometer body 108 and a bottom or inward facing surface 218 with respect to the net radiometer body 108. The inward facing surface 218 includes two portions: an outer planar region 220 that is essentially flat and a stem 222 that is located approximately in the center of the inward facing surface 218. In FIG. 2A and FIG. 3, the centric stem is cylindrical in shape and extends into the net radiometer body 108 farther than the outer planar region 220.

A portion of the thermal load flows through the stem 222 of the lower thermal absorber 104 to a second thermally conductive metal disc 224. Another portion of the thermal signal load is dissipated through the net radiometer body 108. The second thermally conductive metal disc 224 has an outward facing surface 309 and an inward facing surface 310 with respect to the net radiometer body 108. The centric portion of the second thermally conductive metal disc 224 outward facing surface 309 is in thermally conductive contact with the stem 222 of the lower thermal absorber 104. The centric portion of the inward facing surface 310 of the second thermally conductive metal disc 224 is in thermal conductive contact with the lower surface of a thermopile 211. The outer edge of second thermally conductive metal disc 224 is in thermal contact with the net radiometer body 108. In FIG. 2A, the second thermally conductive metal disc 224 rests on a second ledge 226 machined or cast with the net radiometer body 108.

Referring to FIG. 2A and FIG. 3, a second thermally insulative disc 230 aligns the stem 222 of the lower thermal absorber 104 approximately with the center of the second thermally conductive metal disc 224. The second thermally insulative disc 230 is made of a material which impedes thermal conductivity and radiative infrared transmission, and is not damaged by heat under naturally occurring environmental conditions, such as nylon, polyoxymethylene (often sold under the brand name Delrin), or other thermal plastic materials. The top or outward facing surface of the second thermally insulative disc 230 impinges against the outer planar region 220 of the lower thermal absorber 104 inward surface. The inward facing surface of the second thermally insulative disc 230 impinges against the outward facing surface 309 outer portion of second thermally conductive metal disc 224. The second thermally insulative disc 230 includes a centric hole disposed to receive the stem 222 of the lower thermal absorber 104. The second thermally insulative disc 230 thickness is proportioned so that the outer edge of the lower thermal absorber 104 is properly seated against the lower surface of the net radiometer body 108 while at the same time the stem 222 impinges against the centric portion of the second thermally conductive metal disc 224.

The second thermally insulative disc 230 is substantially identical structure to the first thermally insulative disc 214. The description in FIG. 4A, FIG. 4B, FIG. 4C, and FIG. 4B of an embodiment of the structure of the first thermally insulative disc 214 can also apply, in an embodiment of the second thermally insulative disc 230.

The arrangement the lower thermal absorber 104, second thermally conductive metal disc 224, second thermally insulative disc 230, net radiometer body 108, and thermopile 211 lower surface described above has the following affect. Radiative energy falling on the lower thermal absorber 104 is both absorbed and converted to heat. A portion of the thermal radiates through the stem 222 of the lower thermal absorber 104 and by thermal conduction through the central portion of the second thermally conductive metal disc 224 to the lower surface of the thermopile 211. The remainder of the thermal signal load in the absorber is partially conducted away through the net radiometer body 108 and partially radiated away as long-wave far infrared radiant energy. Any excess in thermal signal load accumulating in either the second thermally conductive metal disc 224 or the thermopile 211 lower surface is conducted away through the net radiometer body 108 through the outer edge of the second thermally conductive metal disc 224.

The thermopile 211 produces a voltage output that is proportional to the temperature difference between its upper surface and lower surface. It follows that the thermopile 211 produces an output voltage that is proportional to the difference in radiant energy falling on or emitted/reflected from the upper thermal absorber 102 and lower thermal absorber 104, because the thermopile 211 upper surface is thermally coupled to the upper thermal absorber 102 and the thermopile 211 lower surface is thermally coupled to the lower thermal absorber 104. The voltage is carried by a pair of wires through a channel 232 in the net radiometer body 108. A calibration factor can be applied to the voltage in order to create a measurement signal representing that net radiant energy that is calibrated in some known units of measure such as $W/m^2$. For example, a calibration factor that converts mV to $W/m^2$ would have units of $W\,m^{-2}\,mV^{-1}$.

Referring to FIG. 3, a portion of the net radiometer body houses a terminal block 312, heating resistor 314 for heating the net radiometer in order to prevent dew formation, and thermistor 316 for measuring the temperature of the net radiometer body 108. An access plate 318 covers the portion housing these elements. The access plate is held to the net radiometer body 108 by a series of screws 320.

The response time of the net radiometer 100 is determined by the rate of time by which the upper thermal absorber 102 and lower thermal absorber 104 thermally re-equilibrate to the temperature of the net radiometer body 108, when the radiative short-wave or long-wave source is removed, or thermally isolated from upper thermal absorber 102 and lower thermal absorber 104. At the same time, for the radiometer to have effective sensitivity, it must be able to channel radiative energy striking, or emitted from, the upper thermal absorber 102 and lower thermal absorber 104 to or from the thermopile 211.

Two-absorber net radiometers having thermal absorbers exposed to the elements have a design trade-off between response time to changing ambient radiant energy and sensitivity to measurement error from wind blowing across the thermal absorber surfaces. Wind sensitivity can decreased by adding mass to the thermal absorber. However, increasing the mass of the thermal absorber will slow instrument response time to changing ambient radiant energy.

The inventor has discovered that by removing mass from the outer planar region of the bottom of the thermal absorber between the stem and outer planar edge, a thermal absorber can be produced with reduced, faster, response time and lower wind sensitivity effect. FIG. 5A, FIG. 5B, and FIG. 5C, FIG. 5D, and FIG. 5E an embodiment of the upper thermal absorber 102 that has mass removed from the outer planar region 206 of the bottom surface of the thermal absorber between the outer edge of the planar region and the stem 208. Referring to FIG. 5D and FIG. 5E, the removal of mass forms a grooved seat region 502 within the outer planar region 206 ending at the stem 208.

The inventor also discovered that improved response time and decreased wind sensitivity may be further facilitated by increasing the surface area contact between the flat planar surface of the absorber stem 208 and the outward facing surface of the metal disc. Although increasing absorber stem length and diameter increases stem thermal mass which would typically result in slower response time in a conventional all planar absorber design, the removal and reallocation of thermal mass from the outer planar region 206 to the absorber stem, results in an overall net reduction in absorber thermal mass and thus improves response time performance, while the increased thermal contact between absorber stem 208 surface area and metal disc exposure reduces instrument signal sensitivity, thus also reducing wind sensitivity effect. In FIG. 5B and FIG. 5E, the stem length has been increased over what it would have been if the material were not removed from the outer planar region 206.

By removing material from the outer planar region 206, it is also possible to redistribute some of the thermal mass removed to the absorber stem length and stem diameter, while also increasing the diameter of the thermal absorber itself, or what it would have been with the material being removed from the outer planar region 206. This may further facilitate the reduction of wind sensitivity without adversely impacting response time, and may actually serve to improve response time if the reallocation of thermal mass results in a net reduction in overall absorber thermal mass, as compared to conventional all planar bottom absorbers of comparable diameter and outward facing shape and pitch.

Referring to FIG. 2A and FIG. 3, the inventor discovered that one of the sources of measurement error which varied from unit to unit was in the inconsistent thermal coupling of the upper thermal absorber 102 to the first thermally conductive metal disc 210 and likewise, inconsistent thermal coupling of the lower thermal absorber 104 to second thermally conductive metal disc 224. Referring to FIG. 5D and FIG. 5E, this problem of inconsistent is minimized by providing radial grooves 504 in on the surface of the stem 208. Thermally conductive adhesive or glue is applied in the radial grooves 504. Referring to FIG. 2A and FIG. 3, the stem 208 is pressed against the first thermally conductive metal disc 210. If the glue is applied in a pre-determined amount so that it is approximately flush with the surface of the radial grooves 504, resulting in a stronger bond and uniform distribution of the glue layer between the first thermally conductive metal disc 210 and the stem 208, then without the radial grooves.

Figure 6A:
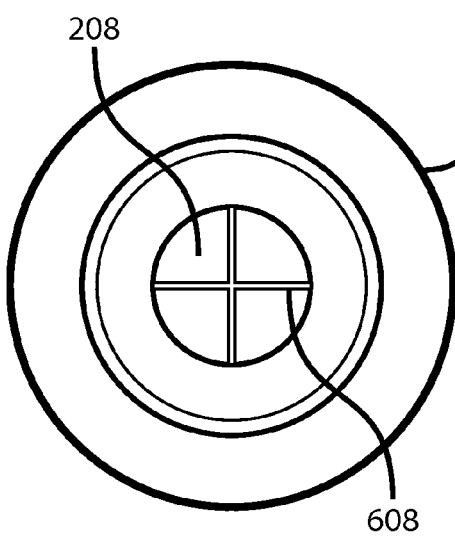
FIG. 6A shows a pattern of four radial grooves on a stem bottom surface of the thermal absorber of FIG. 2.
Figure 6B:
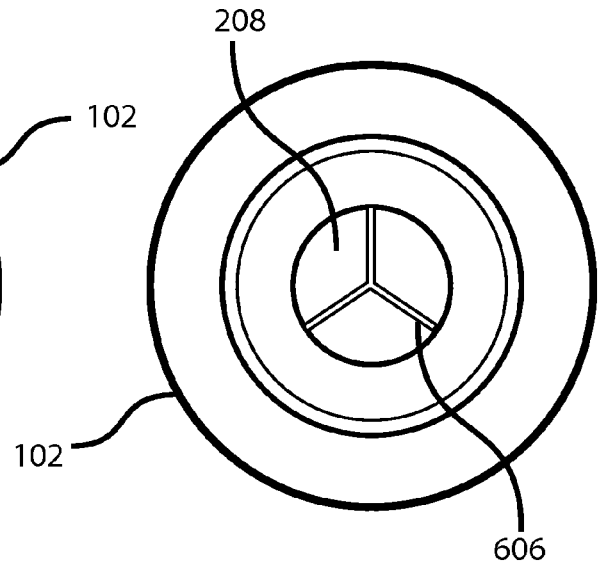
FIG. 6B shows a pattern of three radial grooves on a stem bottom surface of the thermal absorber of FIG. 2.
Figure 6C:
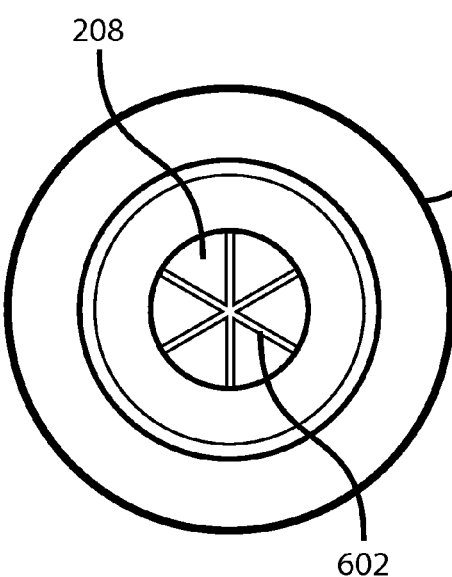
FIG. 6C shows a pattern of six radial grooves on a stem bottom surface of the thermal absorber of FIG. 2.
Figure 6D:
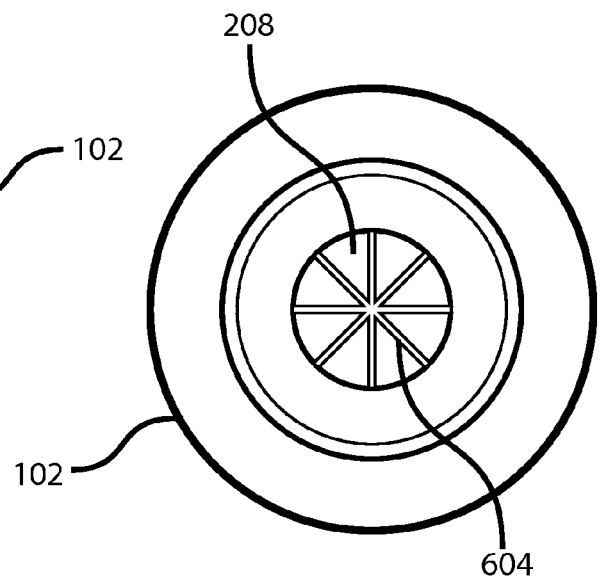
FIG. 6D shows a pattern of eight radial grooves on a stem bottom surface of the thermal absorber of FIG. 2.

Referring to FIG. 6A, FIG. 6B, FIG. 6C, and FIG. 6D, the radial grooves may be applied in a variety of patterns. FIG. 6C shows a six-groove pattern 602 where each groove is offset equally by approximately 60 degrees. FIG. 6D shows an eight-groove pattern 604 where each groove is offset by approximately 45 degrees. While absorbers with these patterns embody principles of the invention, it was found by experimentation, that a three-groove pattern 606 of FIG. 6B and a four-groove pattern 608 of FIG. 6A are optimal. A three-groove pattern 606 and four-groove pattern 608 provide the compromise between glue bond layer and stem to disc surface area thermal contact.

Referring to FIG. 7A, FIG. 7B, FIG. 7C, FIG. 7D, and FIG. 7E, and as referred to in co-pending patent application by the inventor U.S. Ser. No. 12/876,117, it may be desirable to manufacture the thermal absorber 702 in two sections and join them together by an adhesive or bonding agent or glue in order to create a single thermal mass. The thermal absorber 702 is divided into two concentric portions: a smaller centric portion 704 and a larger outer portion 706. The larger outer portion 706 bottom surface is divided into an outer planar region 708 and a centric stem 710. The centric portion 704 is coated with a material that enables it to either absorb or emit long-wave infrared radiant energy while reflecting away short-wave radiant energy. The outer portion 706 is coated with a material that enables absorption of both short-wave and long-wave radiant flux energy, absorbing long-wave energy and converting short-wave energy to heat, while also being emissive in the long-wave far infrared spectrum and radiating long-wave far infrared radiant energy to a colder source such as a clear sky. The size of the centric portion 704 with respect to the outer portion 706 is proportioned so that a thermal balance is achieved with the thermal absorber 702 sensitivity to short-wave and long-wave far infrared radiant energies from perspective of centric stem 710 bottom surface.

Figure 7A:
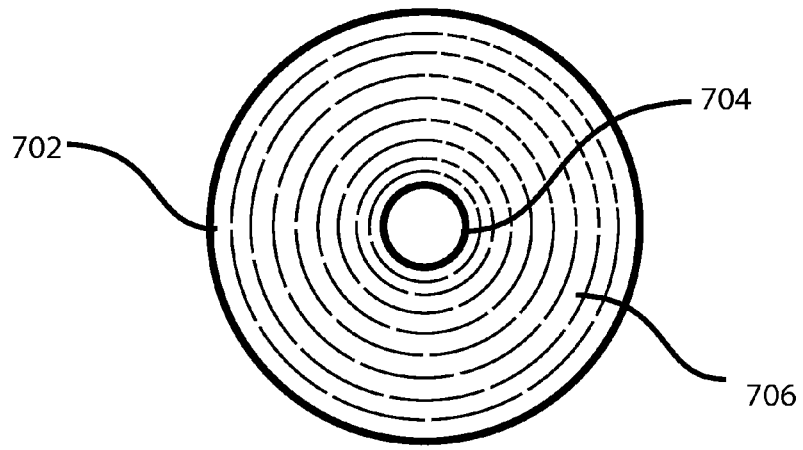
FIG. 7A shows a top view of net radiometer two-piece thermal absorber.
Figure 7B:
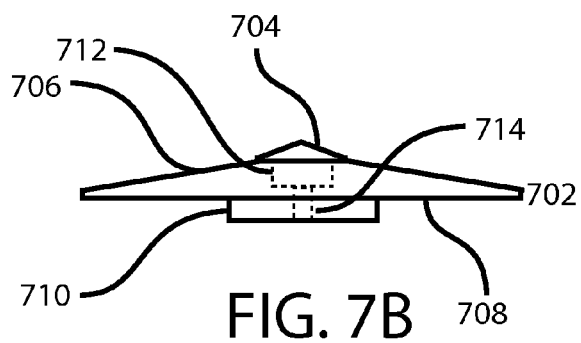
FIG. 7B shows a side cutaway view of net radiometer two-piece thermal absorber of FIG. 7A.
Figure 7D:
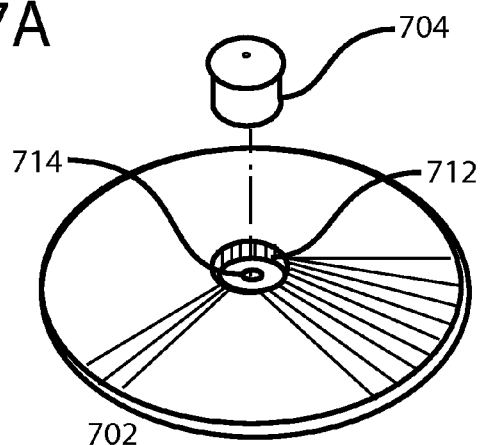
FIG. 7D shows a top perspective view of net radiometer two-piece thermal absorber of FIG. 7A.
Figure 7C:
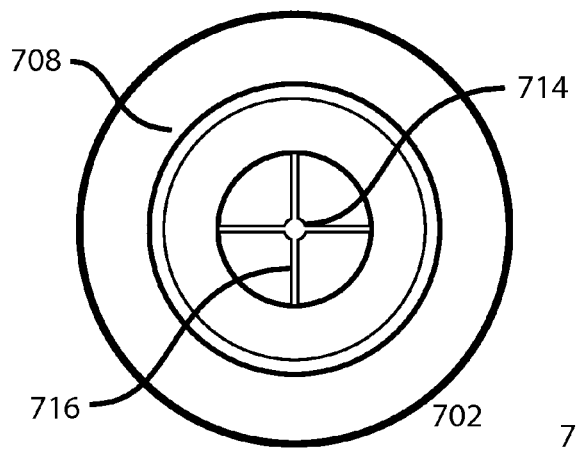
FIG. 7C shows a bottom view of net radiometer two-piece thermal absorber of FIG. 7A.
Figure 7E:
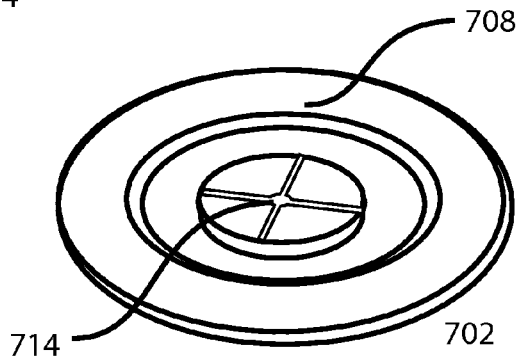
FIG. 7E shows a bottom perspective view of net radiometer two-piece thermal absorber of FIG. 7A.

Referring to FIG. 7C, the centric portion 704 is glued to a centric hole or centric cavity 712. The bottom of the centric cavity 712 is planar and an approximately centric hole 714 extends from the bottom of the centric cavity 712 to the approximately the center of the bottom of the centric stem 710. FIG. 7B shows a cut away view of the joined thermal absorber 702 with both the centric portion 704 and outer portion 706 along with the centric cavity 712 and the centric hole 714 that extends from the bottom of the centric cavity 712 to the face of the centric stem 710. FIG. 7E shows a bottom perspective view of the thermal absorber 702 and FIG. 7D shows a bottom view of the thermal absorber 702. In these views, the centric hole 714 joins the radial grooves 716. The purpose of the centric hole 714 is twofold, first to provide a relief hole for excess adhesive applied in the inside of the centric cavity 712 to flow and second, to provide a possible point to dispense adhesive either fully or partially into the radial grooves 716.

Figure 8A:
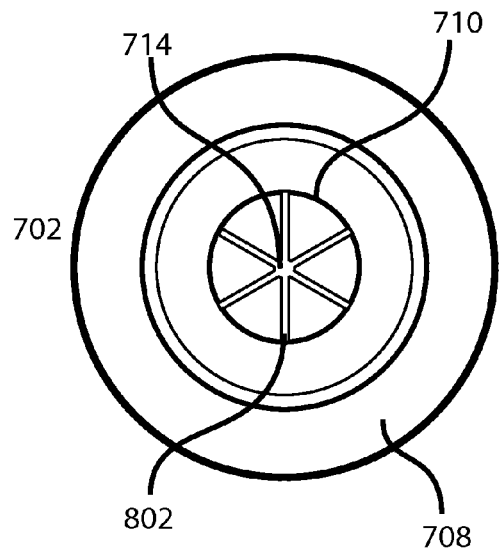
FIG. 8A shows a pattern of six radial grooves on a stem bottom surface of the thermal absorber of FIG. 7A.
Figure 8B:
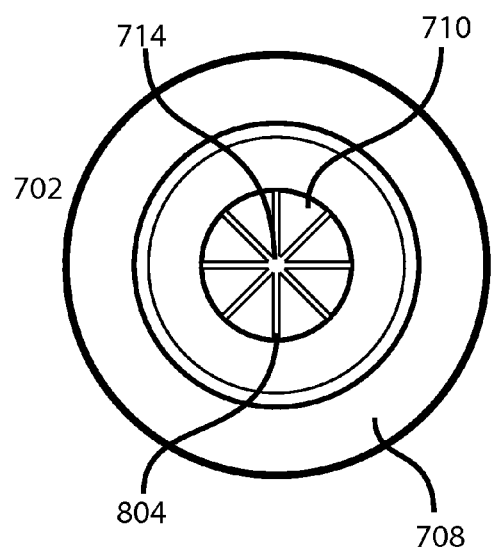
FIG. 8B shows a pattern of eight radial grooves on a stem bottom surface of the thermal absorber of FIG. 7A.
Figure 8C:
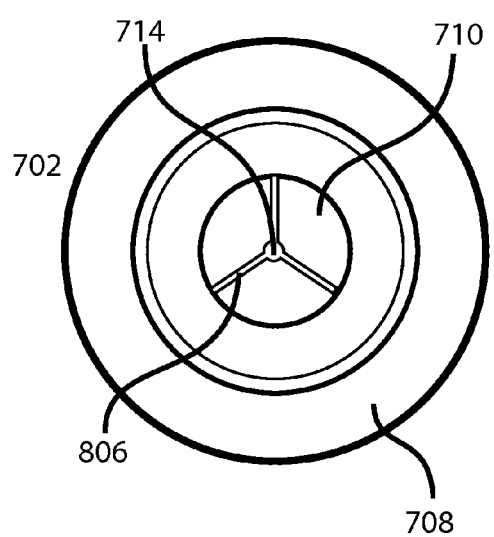
FIG. 8C shows a pattern of three radial grooves on a stem bottom surface of the thermal absorber of FIG. 7A.
Figure 8D:
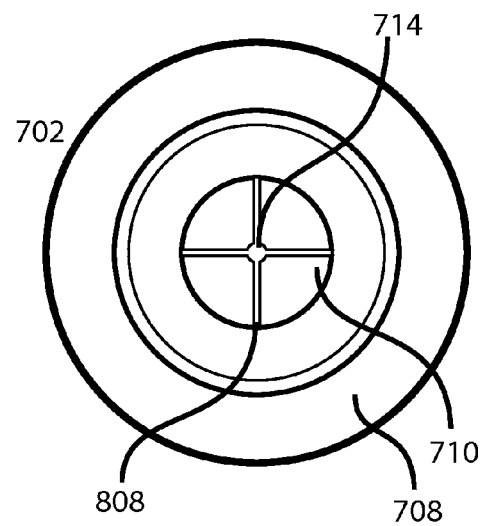
FIG. 8D shows a pattern of four radial grooves on a stem bottom surface of the thermal absorber of FIG. 7A.

Several radial groove patterns are possible. FIG. 8A shows a six-groove pattern 802 where each groove is offset equally by approximately 60 degrees. FIG. 8B shows an eight-groove pattern 804 where each groove is offset by approximately 45 degrees. While absorbers with these patterns embody principles of the invention, it was found by experimentation, that a three-groove pattern 806 of FIG. 8C and a four-groove pattern 808 of FIG. 8D are optimal. A three-groove pattern 806 and four-groove pattern 808 provide the compromise between glue bond layer and stem to disc surface area thermal contact. In FIG. 8A, FIG. 8B, FIG. 8C, and FIG. 8D, each grove radiates out from the centric hole 714.

Figure 9A:
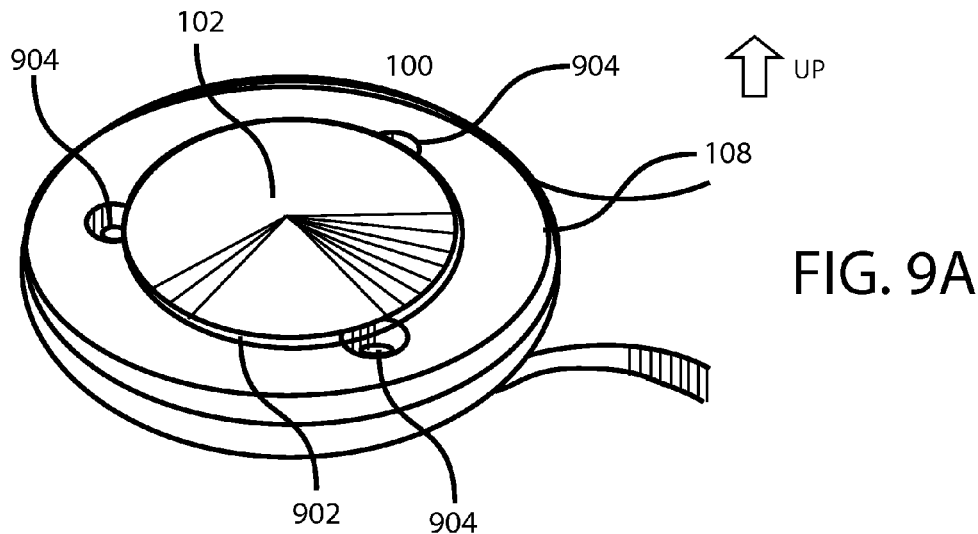
FIG. 9A is a top partial top perspective view of the portion of the two-way net radiometer body that includes the thermal absorbers.
Figure 9B:
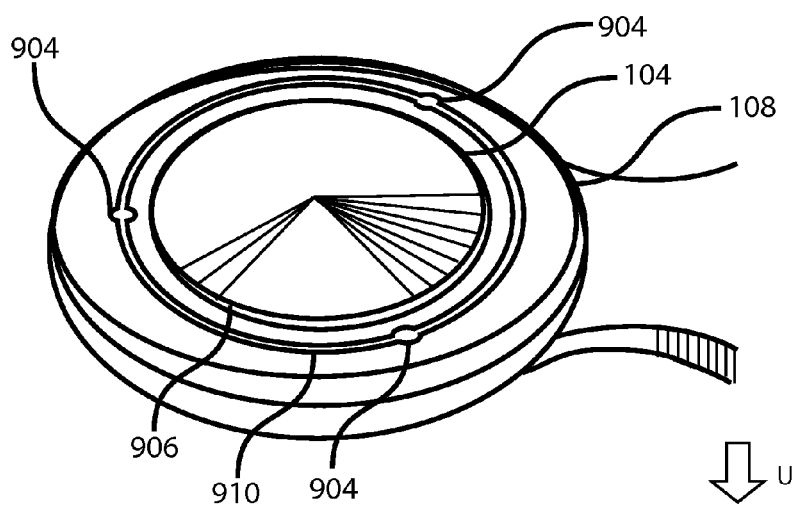
FIG. 9B is a bottom partial view of the net radiometer of FIG. 9A.
Figure 9C:
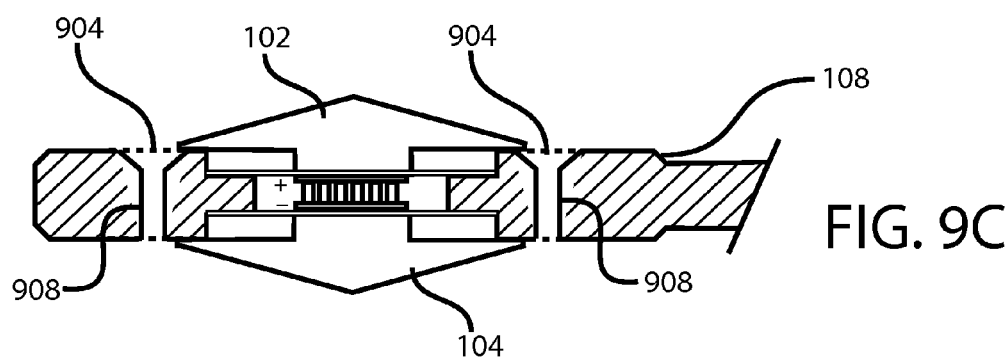
FIG. 9C is a cut away view of the same net radiometer of FIG. 9A.

FIG. 9A is a top partial top perspective view of the portion of the two-way net radiometer body that includes the thermal absorbers. In this embodiment, the thermal absorbers are conically shaped. The conical pitch angle is approximately 10 degrees although other pitch angles are possible. FIG. 9B is a bottom partial view of the same net radiometer body portion. FIG. 9C is a cut away view of the same net radiometer body absorber portion. The inventor discovered that moisture might be more easily dissipated from the thermal absorber surface by arranging the thermal absorber with the respect to the net radiometer body so that the circumferential edge 902 of the upper thermal absorber 102 forms an outward ridge with respect to the plane of the net radiometer body 108. This arrangement promotes the breaking of surface tension of water droplets that may form at the junction between the net radiometer body 108 and upper thermal absorber 102 outer circumference edge 902. In addition, the net radiometer body 108 provides drain holes shaped so that a portion of each drain hole 904 overlaps the outer circumference 902 of upper thermal absorber 102 but do not overlap and are located outward from the outer circumference 906 of the lower thermal absorber 104.

Referring to FIG. 9A and FIG. 9C, the top portion of the drain hole 904 is flared in order to encourage downward moisture flow. In FIG. 9C, part of the flared portion overlaps the bottom edge of the outer circumference 902 of the upper thermal absorber 102. The inventor discovered that this arrangement helps to facilitate water or moisture flow into the drain hole. Referring to FIG. 9B, and FIG. 9c, the main portion of the drain hole 904 is substantially cylindrical in shape and the bottom of the flared portion approximately defines the diameter of the cylindrical portion 908. As a consequence, the drain hole diameters on the bottom side of the net radiometer body 108 are smaller than the drain hole diameters on the top side of the net radiometer body 108. Referring to FIG. 9C, while the cylindrical portion 908 of the drain hole 904 is substantially perpendicular to bottom surface of the net radiometer body 108, it may be advantageous to angle the cylindrical portion 908 of the drain holes 904 away from the lower thermal absorber 104.

Referring to FIG. 9C, the drain holes 904 on the net radiometer bottom body portion do not overlap the lower thermal absorber 104. FIG. 9B shows a concentric groove 910 that intersects the drain holes 904. The groove 910 acts as a drip edge and helps prevent moisture from rolling onto the lower thermal absorber 104 surface. While FIG. 9B shows the concentric groove 910 intersecting the drain holes 904, the concentric groove may be placed anywhere between the outer tangent of the circumference of the drain holes up to just before the outer circumferential edge 906 of the lower thermal absorber 104 in order to still form an effective drip edge.

Figure 10A:
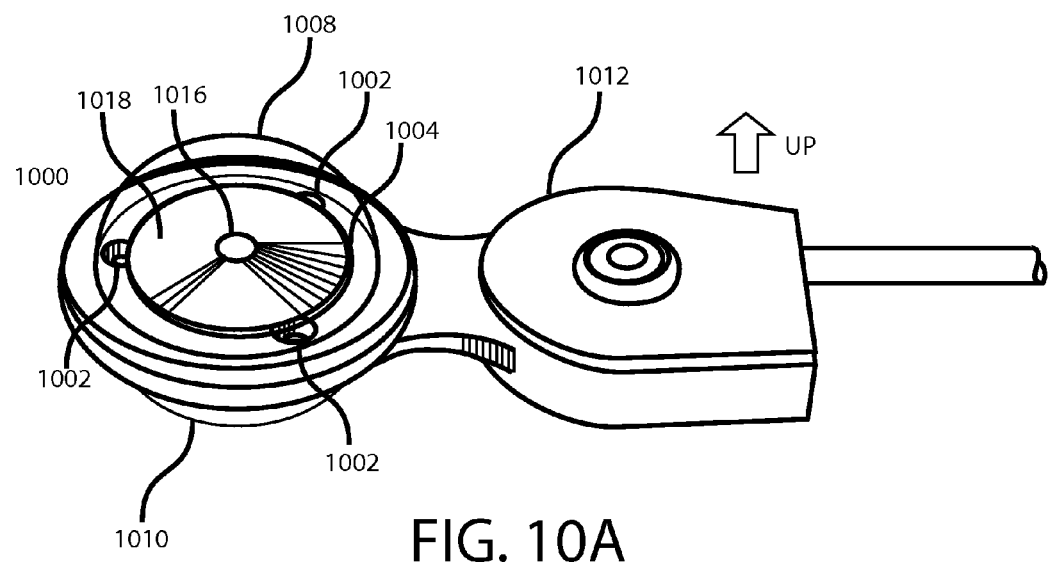
FIG. 10A shows a top perspective view of domed two-way net radiometer with drainage holes and thermal absorbers mounted in accordance with the principles of the invention.
Figure 10B:
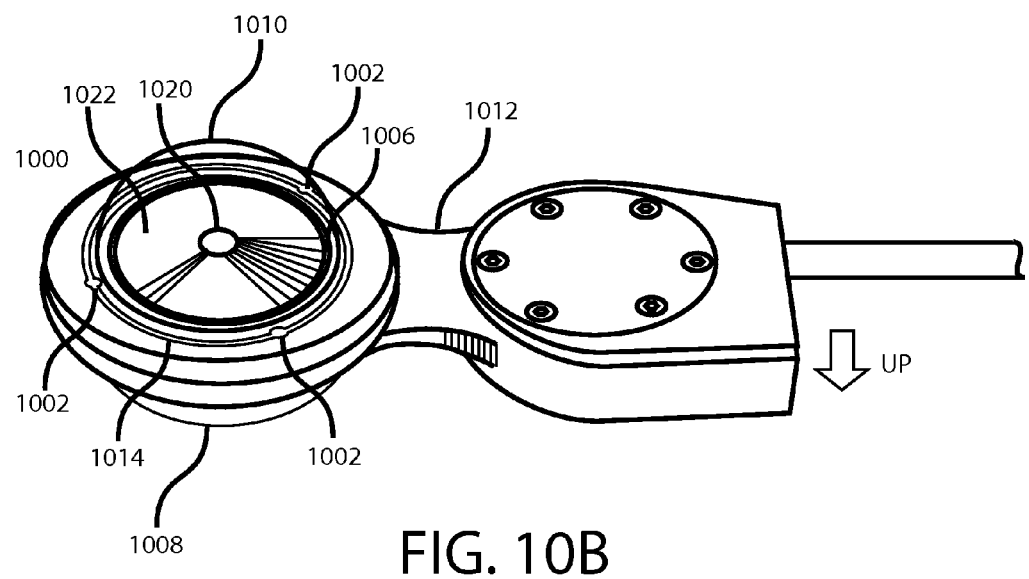
FIG. 10B shows a bottom perspective view of domed two-way net radiometer of FIG. 10A.

While the invention was motivated by the discovery by the inventor of a source of a problems that occurred with domeless two-way net radiometers, it may also be desirable to create domed two-way net radiometers embodying principles of the invention. The dome must be made of a material that transmits both long-wave far infrared and short-wave radiant energy. For example, certain high-density polyethylene plastics (HDPE), such as ethylene/butyl acrylate/acrylic acid terpolymer, sold under the trade name Lupolene, have a spectrally transmissive in the range of 300 nm to 60,000 nm. FIG. 10A shows a top perspective view of domed two-way net radiometer 1000 with drain holes 1002 and an upper thermal absorber 1004 mounted in accordance with the principles of the invention. FIG. 10B is a bottom perspective view of the same two-way domed net radiometer 1000 with a lower thermal absorber 1006 mounted in accordance with the principles of the invention. Referring to FIG. 10A and FIG. 10B, the upper dome 1008, covers the drain holes 1002, while the lower dome 1010 leaves the drain holes 1002 in the net radiometer body 1012 exposed so that water can drain out of the net radiometer body 1012. The upper dome 1008 is larger than the lower dome 1010 in order to accommodate this arrangement. In addition, the net radiometer body 1012 downward facing surface includes a concentric groove 1014 that is positioned to act as a drip edge and prevent moisture from flowing back onto the lower dome 1010. While the domes normally protects both the upper thermal absorber 1004 and lower thermal absorber 1006 from the elements, it is not uncommon for domes to become damaged or cracked from aggressive birds or other wildlife, including extended ultraviolet solar radiation exposure. Therefore, it is desirable for the absorbers to have water resistant coatings just like in the domeless net radiometers described in this disclosure.

In FIG. 10A and FIG. 10B, the upper dome 1008 and lower dome 1010 are made of a material that does not filter out long-wave far infrared radiant energy such as Lupolene. This is a critical element for a domed net radiometer that is fully responsive to both short-wave radiant energy and long-wave far infrared radiant energy. Each thermal absorber in this embodiment is formed from two portions. The larger portion is coated with a water repellant material such as black PTFE that absorbs and emits long-wave far infrared radiant energy, while also absorbing short-wave radiant energy. The smaller portion is coated with a water repellant material such as white PTFE that absorbs and emits long-wave far infrared radiant energy, while reflecting short-wave radiant energy. Black PTFE is spectrally sensitive to short-wave radiant energy. The upper absorber smaller portion 1016 and larger portion 1018 are sized in a proportion in order to balance thermally the spectral response of the long-wave far infrared and short-wave radiant energy within each thermal absorber. Likewise, the lower absorber smaller portion 1020 and larger portion 1022 are sized in a proportion in order to balance thermally the spectral response of the long-wave far infrared and short-wave radiant energy within each thermal absorber.

Figure 11A:
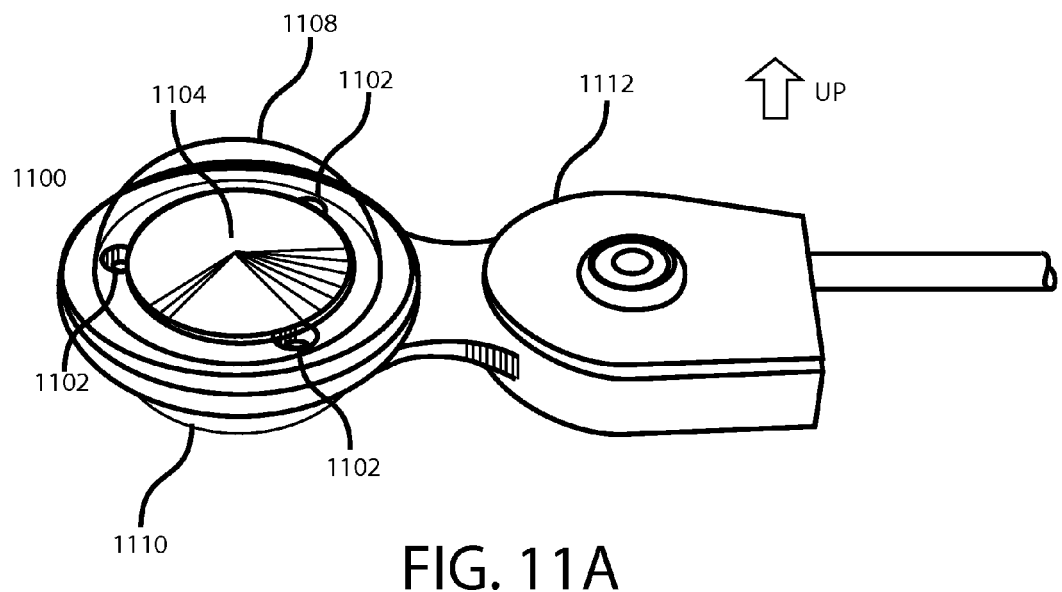
FIG. 11A shows a top perspective view of a domed net radiometer with drainage holes and single piece thermal absorbers mounted in accordance with the principles of the invention.
Figure 11B:
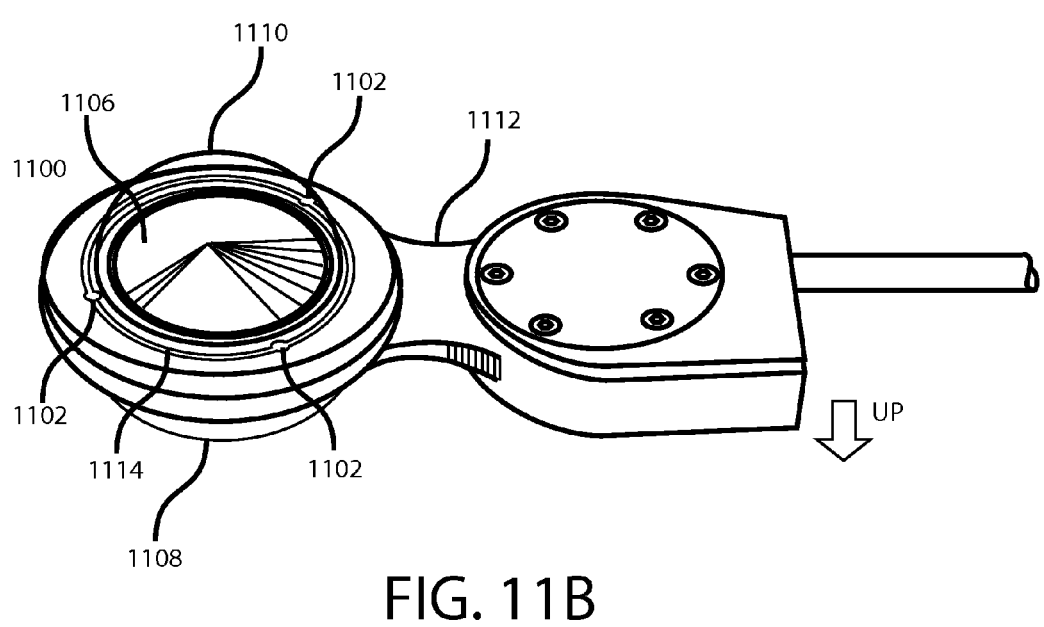
FIG. 11B shows a bottom perspective view of domed two-way net radiometer of FIG. 11A.

FIG. 11A shows a top perspective view of a domed net radiometer with drain holes 1102 and an upper thermal absorber 1104 and lower thermal absorber 1106 both mounted in accordance with the principles of the invention with single piece absorbers. FIG. 11B is a bottom perspective view of the same two-way domed net radiometer 1100. Referring to FIG. 11A and FIG. 11B, the upper dome 1108, covers the drain holes 1102 and upper absorber 1104, while the lower dome 1110 covers the lower absorber 1106 but leaves the drain holes 1102 in the net radiometer body 1112 exposed so that water can drain out of the net radiometer body 1112. The upper dome 1108 is larger than the lower dome 1110 in order to accommodate this arrangement. In addition, the net radiometer body 1112 downward facing surface includes a concentric groove 1114 that is positioned to act as a drip edge and prevent moisture from flowing back onto the lower dome 1110.

As disclosed for the embodiment of FIG. 10A and FIG. 10B, in FIG. 11A and FIG. 11B, the upper dome 1108 and lower dome 1110 are made of a material that does not filter out long-wave far infrared radiant energy. This is a critical element for a domed two-way net radiometer that is fully responsive to both short-wave radiant energy and long-wave far infrared radiant energy.

As disclosed in preceding paragraphs, PTFE (Polytetrafluoroethylene), often sold under the brand name Teflon, has excellent water repellent or hydrophobic properties making it a desirable surface coating. Black PTFE absorbs and emits long-wave far infrared, while also absorbing short-wave radiant energy. However, black PTFE formulated with black carbon are spectrally more sensitive to short-wave radiant energy than long-wave radiant energy and therefore is not spectrally balanced with respect to sensitivity across the entire solar and terrestrial radiation spectrums, from 200-50, 000 nm nominally. A net radiometer with absorbers coated only with black PTFE would exhibit a nighttime measurement error, or under estimation of the nighttime net long-wave infrared signal, if the instrument calibration were optimized by the manufacturer for daytime use, which is typically the case for two-way domeless net radiometers. This is described in the present inventor's co-pending U.S. patent application Ser. No. 12/876,117. White PTFE reflects short-wave radiant energy and absorbs or emits long-wave far infrared radiant energy. A net radiometer, in accordance with principles of the invention, can minimize any nighttime measurement error by applying to each absorber a portion coated with black PTFE and a portion coated with white PTFE in a proportion that thermally balances the absorber's thermal sensitivity between short-wave and long-wave far infrared radiant energy.

Black and white PTFE coatings have different curing times and temperatures making it difficult to apply both coating to a singular surface or absorber. An embodiment of the thermal absorber 702 of FIG. 7A, FIG. 7B, FIG. 7C, FIG. 7D, and FIG. 7E in accordance with principles of the invention, solves this problem of applying the two surface coatings to form a singular thermal mass. Black PTFE is applied as a surface coating on the outer portion 706 and white PTFE is applied as a surface coating on the centric portion 704. The two pieces are joined together as described and as shown in FIG. 7B, forming a singular thermal mass. In the illustrated embodiment, using a formulation of black PTFE on the outer portion 706, and a formulation of white PTFE on the centric portion 704, the surface area of the centric portion 704 accounts for less than ⅓ of the total surface area of the of the thermal absorber 702.

In the embodiment of FIG. 7B and FIG. 7C, the outer portion 706 and centric portion 704 are both conically pitched in order to encourage moisture run-off. In addition, the centric portion 704 has a slightly greater conical pitch angle than the outer portion 706 in order to prevent moisture accumulation at the junction of the two-absorber components. Choosing the conical pitch angle of the larger outer portion 706 is a tradeoff between two factors: (1) prevention of water accumulation build up on the absorber surface and (2) measurement errors resulting from a change in incident reception angle of received short-wave radiant energy flux relative to the horizontal plane. The conical pitch angle that is a balance of these two factors is typically between 5 and 15 degrees on the outer portion 706, and 10 degrees to 25 degrees on the centric portion 704. The centric portion 704 is not subject to the aforementioned short-wave angular response error effects, as this portion of the absorber is non-responsive to and reflects short-wave radiant energy.

The net radiometer thermal absorbers embodied in both FIG. 7A, FIG. 7B, FIG. 7C, FIG. 7D, and FIG. 7C have their absorber portions shaped and configured so each absorber portion is nearly equally exposed to the sun no matter the sun angle. This is preferred. Otherwise complex measurement errors could be introduced based on time of day or time of year. One way to accomplish this is to have the absorber portions with approximate concentric symmetry so that the ratio of the short-wave radiant energy striking each portion is approximately the same no matter what the angle of incidence of the radiant energy.

Figure 12:
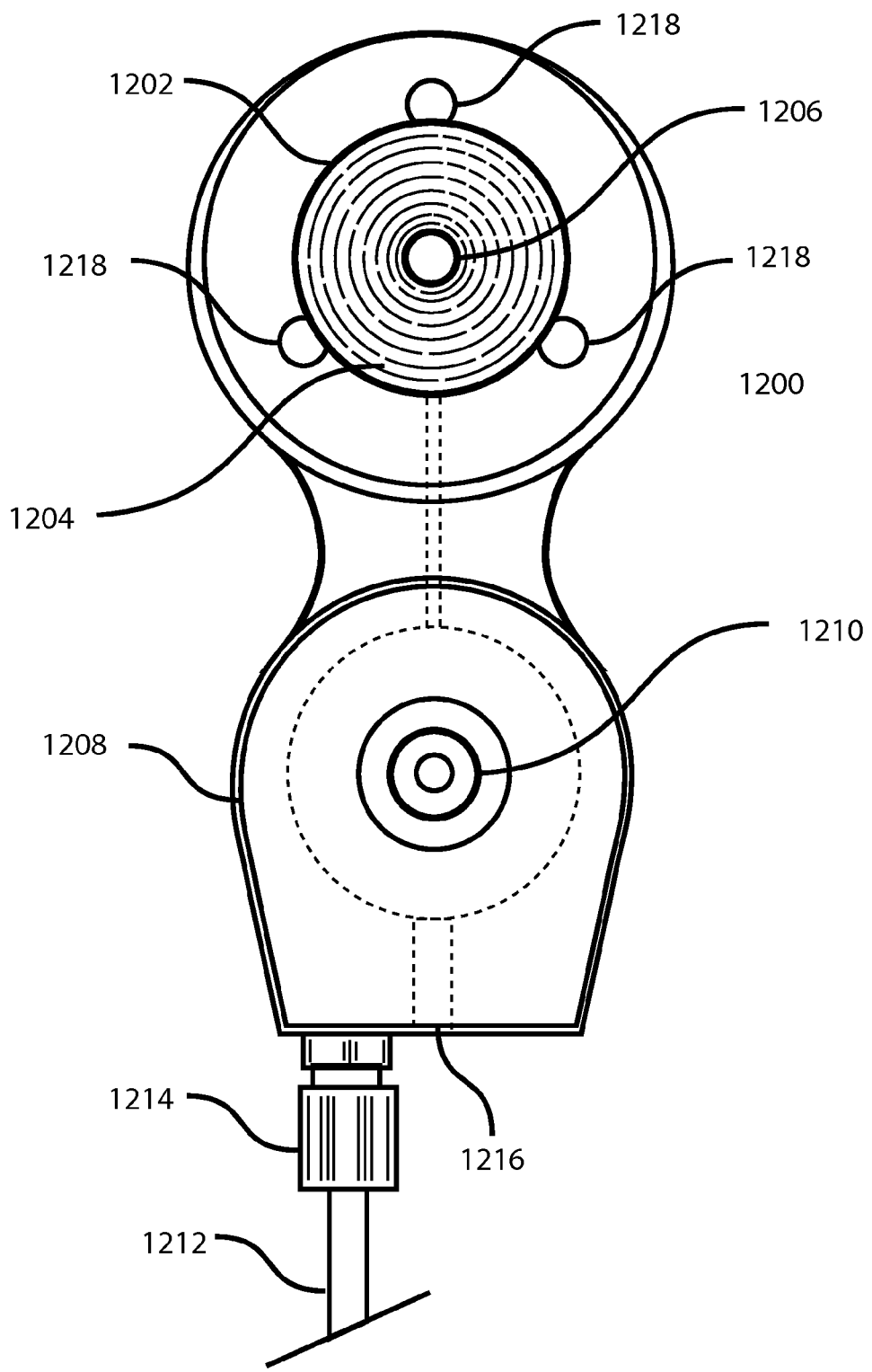
FIG. 12 shows a top view of a two-absorber net radiometer with thermal absorbers embodying the principles of FIG. 7A.

FIG. 12 shows a top view of a two-absorber net radiometer 1200 with thermal absorbers embodying the principles of FIG. 7A. The upper thermal absorber 1202 is shown with the larger portion 1204 and smaller portion 1206 configured like the absorber shown in FIG. 7A, FIG. 7B, FIG. 7C, FIG. 7D, and FIG. 7E. The net radiometer body 1208 has the bubble level 1210 for visually aiding in the horizontal leveling of the net radiometer at installation. The instrument signal cable 1212 is connected to the body through a weatherproof gable gland 1214, which is screwed into the rear of the instrument housing.

Figure 13A:
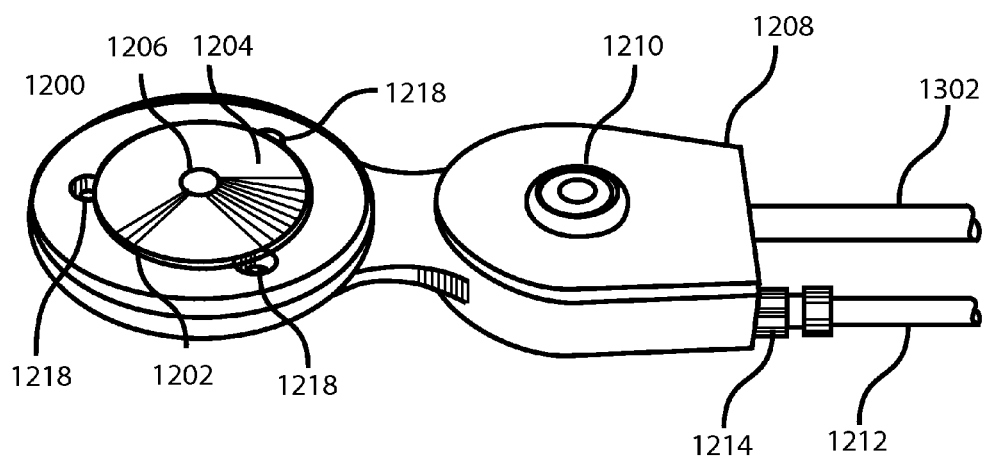
FIG. 13A is a top perspective view of the net radiometer of FIG. 12.
Figure 13B:
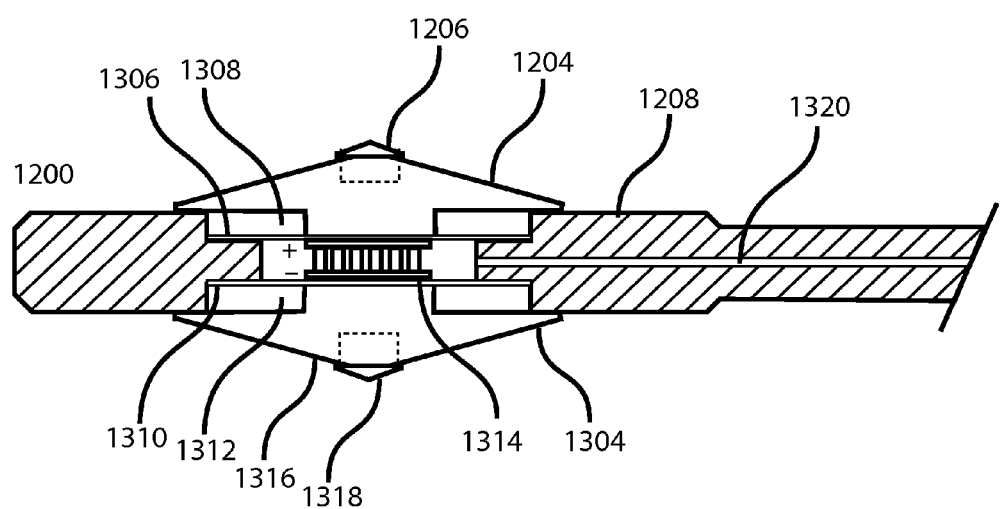
FIG. 13B is a partial cutaway view of the net radiometer of FIG. 12.

FIG. 13A is a top perspective view of the net radiometer 1200 shown in FIG. 12. FIG. 13B is a partial cutaway view of the net radiometer 1200 in FIG. 12 and FIG. 13A. Referring to FIG. 12 and FIG. 13A, the instrument mounting rod 1302 is screwed into a threaded hole 1216 at the rear of the net radiometer body 1208. The net radiometer body includes drain holes 1218, in accordance with principles of the invention, and similar in structure to those discussed in this disclosure. FIG. 13B shows a lower thermal absorber 1304, first thermally conductive disc 1306, first thermally insulative disc 1308, second thermally conductive metal disc 1310, second thermally insulative disc 1312, and thermopile detector 1314, configured in a similar manner as disclosed in FIG. 2A. The lower thermal absorber 1304 is virtually identical to the upper thermal absorber 1202 and has a larger portion 1316 and a smaller portion 1318 configured in accordance to thermal absorbers disclosed and described for the upper thermal absorber 1202. The thermopile 1314 has two wires that are drawn through a channel 1320 in the net radiometer body 1208.

Figure 14:
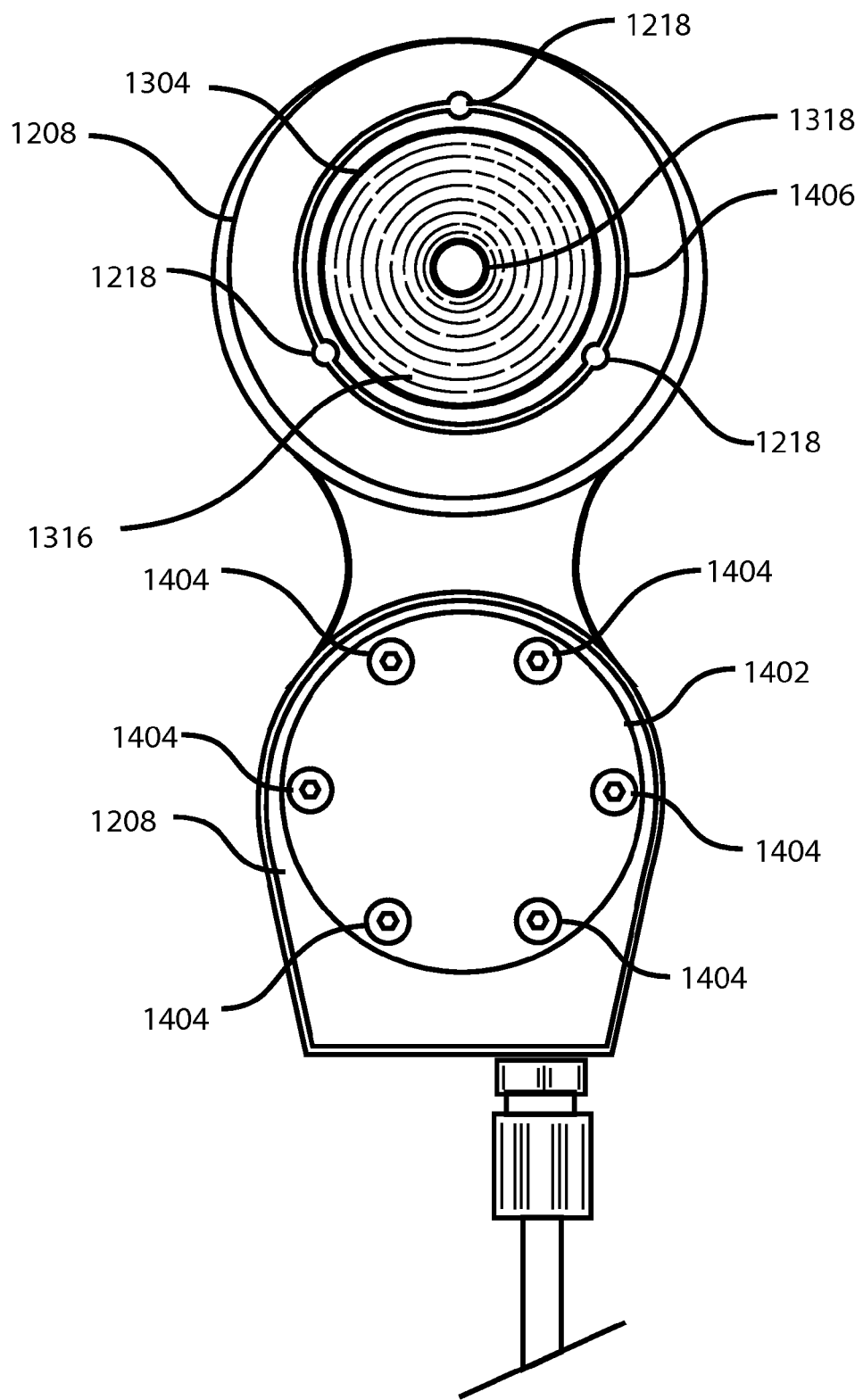
FIG. 14 shows the bottom view of the net radiometer of FIG. 12.

FIG. 14 shows the bottom view of the net radiometer 1200 of FIG. 12. The bottom side of the net radiometer body 1208 has an access plate 1402 held into the net radiometer body 1208 by screws 1404. As disclosed in similar embodiments, the drain holes are configure so that they do not overlap the lower thermal absorber 1304. A concentric groove 1406 intersects the drain holes 1218 and acts as a drip edge by preventing moisture from rolling onto the lower thermal absorber 1304.

Figure 15:
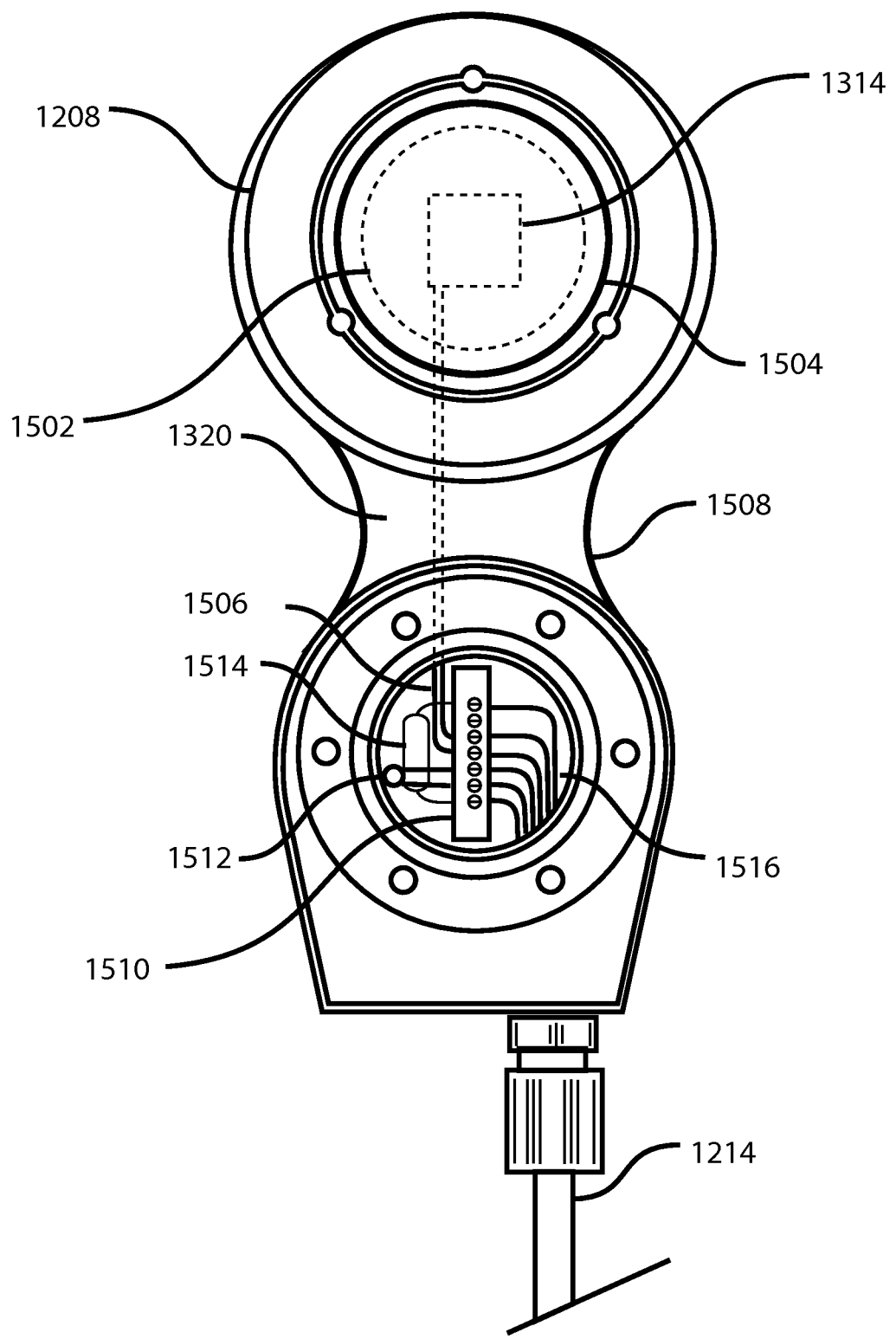
FIG. 15 shows internal details of the net radiometer of FIG. 14.

FIG. 15 shows a bottom view, featuring internal details, of the embodiment of FIG. 14. The access plate 1402 of FIG. 14 is removed and detail of structure below the lower thermal absorber 1304 is also revealed. FIG. 15 shows the outline of a second thermally conductive metal disc 1502 below the outline of lower absorber edge 1504. The outline of the thermopile 1314 is also shown in relation to both the second thermally conductive metal disc 1502 and the lower absorber edge 1504.

Referring to both FIG. 13B and FIG. 15, thermopile electrical wires 1506 which provide a differential signal voltage potential proportional to the temperature difference, or ΔT, generated across the thermopile 1314 upper and lower absorber surfaces, is channeled through the net radiometer body 1208 through the channel 1320 in the net radiometer neck 1508. These thermopile electrical wires 1506 connect to an electrical terminal block connector 1510. The terminal block connector has two sides where connections on one side are electrically connected to the same terminal on the opposite side. Also attached to the same side of the electrical terminal block connector 1510 is a thermistor 1512 for measuring the temperature of net radiometer body 1208 and a resistor 1514 for heating the net radiometer body 1208 in order to prevent dew formation, or melt snow/ice. The other side of the terminal block connector has a set of electrical wires 1516 that conduct the signals from the thermopile electrical wires 1506, the resistor 1514, and the thermistor 1512, into the external instrument signal cable 1212.

Figure 16:
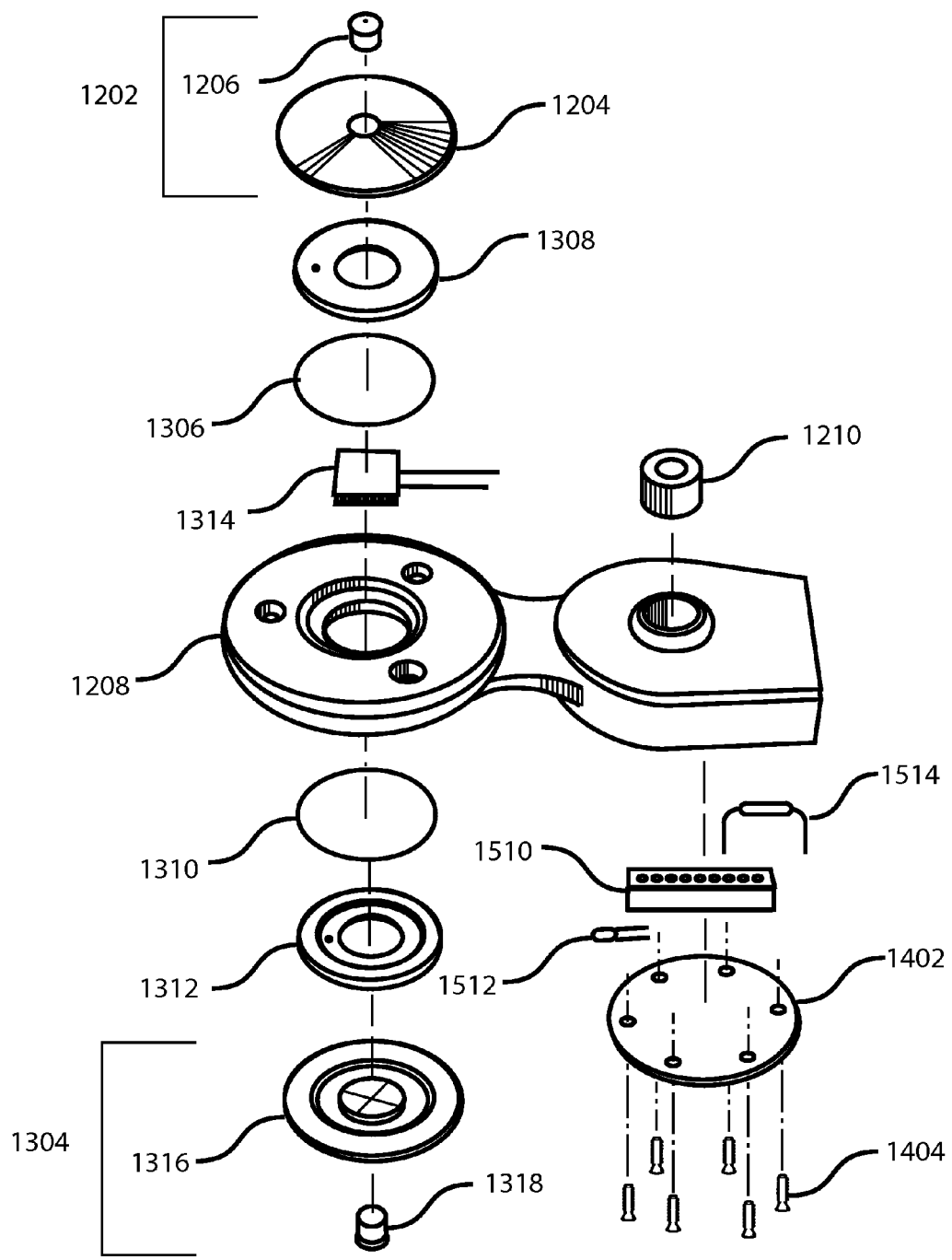
FIG. 16 shows a top perspective exploded view of the net radiometer of FIG. 12.

FIG. 16 shows a top perspective exploded view of the net radiometer of FIG. 12 and is included here for clarity with numbered elements disclosed in the preceding paragraphs.

A net radiometer with the above mentioned objectives have been described. Those skilled in the art should appreciate that the invention is not intended to be limited to the preferred embodiments of the invention described within this disclosure. Various modifications will be apparent, particularly upon consideration of the teachings provided herein. Therefore, the invention should be understood to extend to the subject matter as defined in the following claims, and equivalents thereof.

What is claimed is:

1. An apparatus, comprising:
   a net radiometer including a thermal absorber with an inward facing surface, the inward surface including an approximately centric stem portion;
   a thermally conductive metal disc in thermally conductive contact with the stem portion;
   thermally conductive adhesive; and
   the stem portion including a planar surface with radial grooves disposed to evenly channel the thermally conductive adhesive.

2. An apparatus of claim 1, further comprising:
   a thermally insulative disc, including a hole sized to receive the stem portion; and
   the thermally insulative disc dimensioned and disposed to concentrically align and impinge the stem portion against the thermally conductive metal disc.

3. An apparatus of claim 2, wherein:
   the thermally insulative disc including a bottom surface including an outer concentric portion impinging against the thermally conductive metal disc and an inner portion, located between the hole and outer portion, that does not impinge against the thermally conductive metal disc.

4. An apparatus of claim 3, wherein the inner portion includes an air pressure relief hole.

5. An apparatus of claim 1, wherein the thermal absorber includes an outward facing surface formed from a first thermal absorber section and a second thermal absorber section, together acting as one singular thermal mass; and
   the first thermal absorber section having a conically pitched outer surface and an approximately centric cavity disposed to receive the second thermal absorber section.

6. An apparatus of claim 5, wherein the cavity includes a bottom surface with a hole positioned and sized to distribute excess thermal adhesive, applied within the cavity, into the radial grooves.

7. An apparatus of claim 5, further comprising:
   a thermally insulative disc, including a hole sized to receive the stem portion and the thermally conductive metal disc; and
   the thermally insulative disc dimensioned and disposed to concentrically align and impinge the stem portion against the thermally conductive metal disc.

8. An apparatus of claim 7, wherein:
   the thermally insulative disc including a bottom surface including an outer concentric portion impinging against the thermally conductive metal disc and an inner portion, located between the hole and outer portion, that does not impinge against the thermally conductive metal disc.

9. An apparatus comprising:
   a net radiometer including two thermal absorbers, positioned approximately 180 degrees in opposition, each with an inward facing surface including an approximately centric stem and an outer planar region; and
   each outer planar region having a portion of material removed between the stem and outer planar region edge.

10. An apparatus of claim 9, wherein:
    the two thermal absorbers are a first thermal absorber and a second thermal absorber;
    the stem of the first thermal absorber is increased in size and mass in approximate proportion so that the first thermal absorber weighs approximately the same or less as before the portion of material in the outer planar region of the first thermal absorber was removed; and
    the stem of the second thermal absorber is increased in size and mass in approximate proportion so that the second thermal absorber weighs approximately the same or less as before the portion of material in the outer planar region of the second thermal absorber was removed.

11. An apparatus of claim 10, further comprising:
    a first thermally conductive metal disc in thermally conductive contact with the stem of the first thermal absorber;
    thermally conductive adhesive;
    the stem of the first thermal absorber including a first planar surface with a first plurality of radial grooves disposed to evenly channel the thermally conductive adhesive;
    a second thermally conductive metal disc in thermally conductive contact with the stem of the second thermal absorber; and
    the stem of the second thermal absorber including a second planar surface with a second plurality of radial grooves disposed to evenly channel the thermally conductive adhesive.

12. An apparatus of claim 11, further comprising:
    a first thermally insulative disc, including a first hole sized to receive the stem of the first thermal absorber;
    the first thermally insulative disc dimensioned and disposed to concentrically align and impinge the stem of the first thermal absorber against the first thermally conductive metal disc;
    a second thermally insulative disc, including a second hole sized to receive the stem of the second thermal absorber; and the second thermally insulative disc dimensioned and disposed to concentrically align and impinge the stem of the second thermal absorber against the second thermally conductive metal disc.

* * * * *